US012723155B2

(12) United States Patent
Liu et al.

(10) Patent No.: US 12,723,155 B2
(45) Date of Patent: Sep. 1, 2026

(54) RESIN COMPOSITION AND PRODUCT MADE THEREFROM

(71) Applicant: ELITE MATERIAL CO., LTD., Taoyuan City (TW)

(72) Inventors: Tse-Hung Liu, Taoyuan City (TW); Chia-Hung Wu, Taoyuan City (TW); Wu-Ching Wu, Taoyuan City (TW)

(73) Assignee: ELITE MATERIAL CO., LTD., Taoyuan City (TW)

( * ) Notice: Subject to any disclaimer, the term of this patent is extended or adjusted under 35 U.S.C. 154(b) by 437 days.

(21) Appl. No.: 18/535,949

(22) Filed: Dec. 11, 2023

(65) Prior Publication Data

US 2025/0129247 A1 Apr. 24, 2025

(30) Foreign Application Priority Data

Oct. 20, 2023 (TW) ................................ 112140261

(51) Int. Cl.
*C08L 71/12* (2006.01)
*C08K 5/103* (2006.01)
(Continued)

(52) U.S. Cl.
CPC .............. *C08L 71/12* (2013.01); *C08K 5/103* (2013.01); *C08K 5/34924* (2013.01); *C08L 79/085* (2013.01)

(58) Field of Classification Search
None
See application file for complete search history.

(56) References Cited

U.S. PATENT DOCUMENTS 4,176,027 A * 11/1979 Gotcher ............... C08K 5/3477 525/326.3
10,000,622 B2 * 6/2018 Kumano ............. C07D 487/04
(Continued)

FOREIGN PATENT DOCUMENTS

CN 110317445 A 10/2019
EP 0100688 B1 * 4/1987 ............... C09D 4/00
(Continued)

OTHER PUBLICATIONS

TW Office Action dated Apr. 16, 2024 as received in Application No. 112140261.

*Primary Examiner* — Robert S Jones, Jr.
*Assistant Examiner* — Lily K Sloan
(74) *Attorney, Agent, or Firm* — Maschoff Brennan

(57) ABSTRACT

A resin composition is provided, which comprises: 100 parts by weight of resin A including vinyl group-containing polyphenylene ether resin or maleimide resin; 5 parts by weight to 15 parts by weight of a compound having a structure represented by Formula (1); and 2 parts by weight to 15 parts by weight of a compound B including a compound having a structure represented by Formula (2), a compound having a structure represented by Formula (3) or a compound having a structure represented by Formula (4). Also, a product made from the aforesaid resin composition is provided, including a resin-coated copper, a laminate or a printed circuit board.

Formula (1)

;

Formula (2)

;

Formula (3)

;

Formula (4)

7 Claims, 6 Drawing Sheets

(51) Int. Cl.
*C08K 5/3492* (2006.01)
*C08L 79/08* (2006.01)

(56) References Cited

U.S. PATENT DOCUMENTS

| | | | | |
|---|---|---|---|---|
| 10,150,856 | B2 * | 12/2018 | Cai | C08J 3/243 |
| 2022/0372284 | A1 | 11/2022 | Hsu et al. | |

FOREIGN PATENT DOCUMENTS

| | | | |
|---|---|---|---|
| TW | 201403238 | A | 1/2014 |
| TW | 201538503 | A | 10/2015 |
| TW | 201542651 | A | 11/2015 |
| TW | 202140672 | A | 11/2021 |
| TW | 202244182 | A | 11/2022 |

* cited by examiner

RESIN COMPOSITION AND PRODUCT MADE THEREFROM

CROSS-REFERENCE TO RELATED APPLICATIONS

This non-provisional application claims priority under 35 U.S.C. § 119(a) on patent application No. 112140261 filed in Taiwan (R.O.C.) on Oct. 20, 2023, the entire contents of which are hereby incorporated by reference.

BACKGROUND

1. Technical Field

This disclosure relates to a resin composition and a product made therefrom.

2. Related Art

As electronic products have been developed toward high density and high precision, higher technologies of printed circuit boards such as high density interconnect (HDI) have been widely used. Using the resin-coated copper is a way of layer build-up process during manufacturing printed circuit boards, which stacks the resin layer of the resin-coated copper on the core and then laminates them to achieve the purpose of layer build-up. One or more advantages of applying resin-coated coppers to layer build-up include reducing the thickness of the insulating layer of the printed circuit board and reducing the width/spacing of lines of the printed circuit board, thereby achieving an overall thinner printed circuit board.

However, when applying the resin-coated copper to layer build-up, it needs to consider whether the resin flow rate of the resin-coated copper decreases or not as the storage time increases, and whether the resin fills the open area while filling the circuit board with the resin. Therefore, how to develop a resin-coated copper that can effectively solve the above problems is a development direction in this field.

SUMMARY

Accordingly, in view of the problems, particularly that conventional materials cannot satisfy the demand for the above one or more performances, encountered in the related art, this disclosure mainly aims at providing a resin composition and a product made therefrom which are capable of satisfying the demand for the above performances.

The present disclosure provides a resin composition, comprising:

- 100 parts by weight of resin A, comprising vinyl group-containing polyphenylene ether resin or maleimide resin;
- 5 parts by weight to 15 parts by weight of a compound having a structure represented by Formula (1); and
- 2 parts by weight to 15 parts by weight of a compound B, comprising a compound having a structure represented by Formula (2), a compound having a structure represented by Formula (3) or a compound having a structure represented by Formula (4);

wherein

Formula (1)

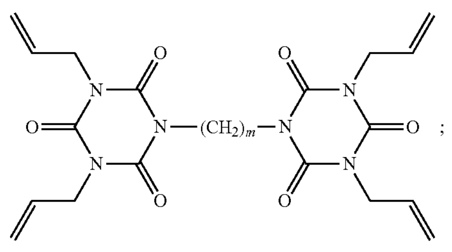

in Formula (1), m is an integer of 2 to 18;

Formula (2)

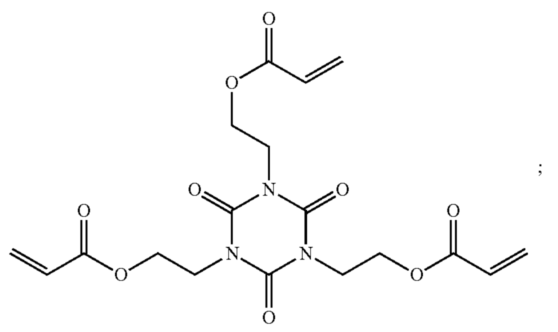

Formula (3)

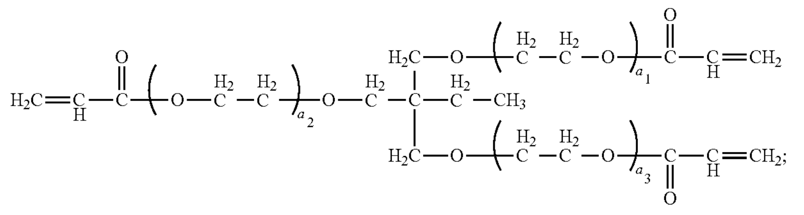

in Formula (3), each of $a_1$, $a_2$ and $a_3$ is independently an integer of 0 to 7;

Formula (4)

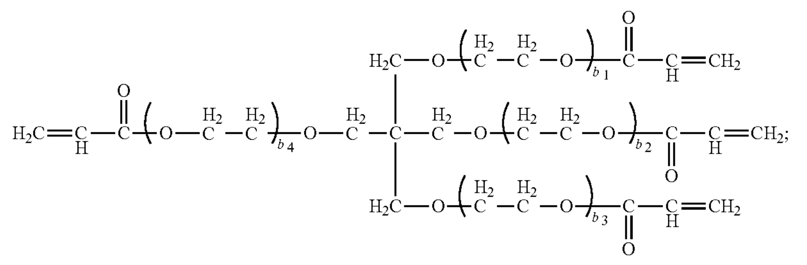

in Formula (4), each of $b_1$, $b_2$, $b_3$ and $b_4$ is independently an integer of 0 to 9.

The present disclosure provides a product made from the aforementioned resin composition, comprising a resin-coated copper, a laminate or a printed circuit board.

The product, such as a resin-coated copper, a laminate or a printed circuit board, made from the resin composition of the present disclosure has an excellent performance in at least one of the resin flow rate of the copper-clad laminate, the filling level of the circuit-containing laminate, the pattern at the edge of the circuit-containing laminate, the X-axis coefficient of thermal expansion and the copper foil peeling strength, therefore, the product can be served as a high-performance laminate that satisfies the comprehensive demands.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
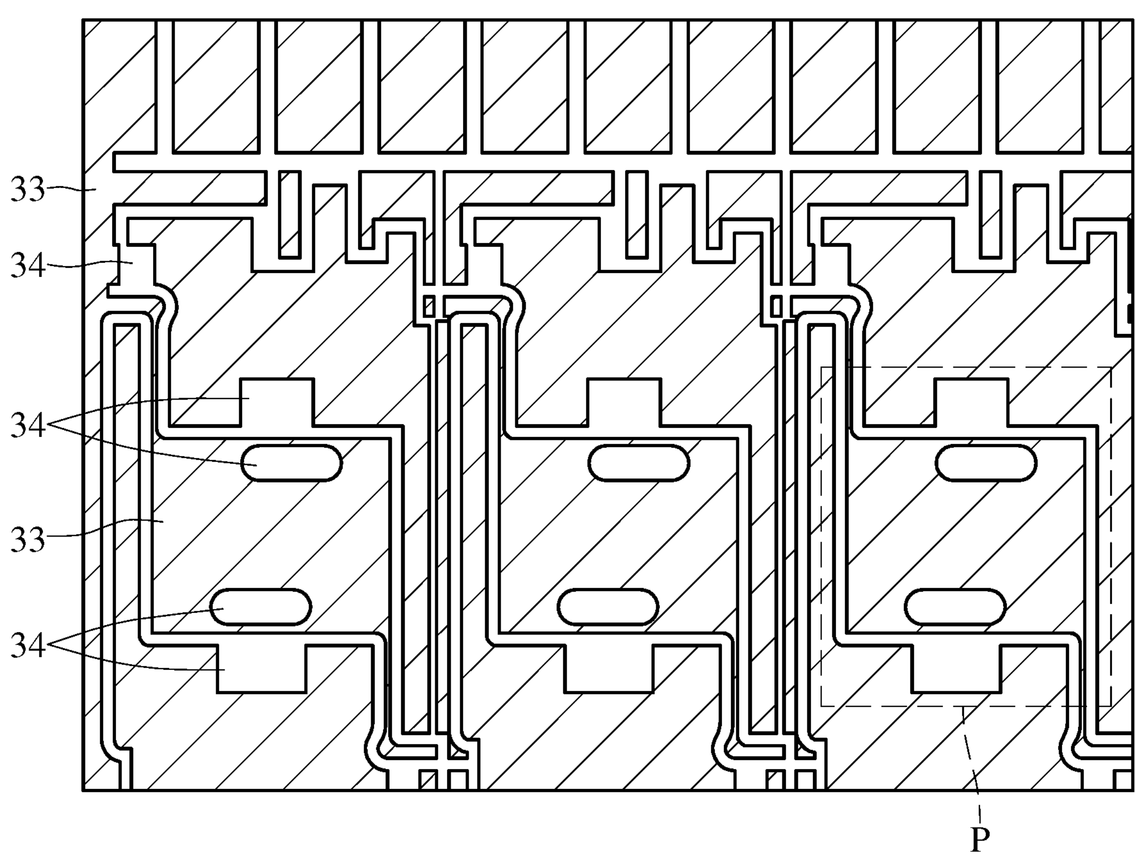
FIG. 1 is a schematic diagram of a partial region of a copper-clad laminate.

The embodiments disclosed herein are not intended to limit the scope of the present disclosure.

All technical and scientific terms used herein have the common meaning as understood by those skilled in the art. If otherwise specified, the terms defined herein shall prevail.

The terms "comprise," "include," "contain," "have," or the like belongs to open-ended transitional phrase (i.e., other elements not listed herein may be contained). The terms "consisting of," "composed by," "remainder being," or the like belongs to close-ended transitional phrases.

The phrase "a composition comprises A, B, and C, wherein A comprises a1, a2, or a3" has the same meaning as the phrase "a composition comprises A, B, and C, wherein A comprises a1, a2, a3, or a combination thereof," that is, "a composition comprises A, B, and C, wherein A comprises a1, a2, a3, a combination of a1 and a2, a combination of a1 and a3, a combination of a2 and a3, or a combination of a1, a2, and a3."

For the convenience of the description, numerical ranges used herein shall be understood as including all of the possible subranges and individual numerals or values therein, including integers and fractions.

The value used herein includes all of the values which will be the same as such value after being rounded off.

A polymer refers to the product formed by monomer(s) via polymerization and includes multiple aggregates of polymers respectively formed by multiple repeated simple structure units by covalent bonds. The monomer refers to a compound forming the polymer. A polymer may include a homopolymer, a copolymer, a prepolymer, etc., but not limited thereto. A prepolymer refers to a chemical substance formed by two or more compounds via polymerization with a conversion rate between 10% and 90%. The term "polymer" includes an oligomer, but the present disclosure is not limited thereto. An oligomer refers to a polymer with 2 to 20, typically 2 to 5, repeating units. For instance, the term "diene polymer" is interpreted as including diene homopolymer, diene copolymer, diene prepolymer, and, of course, diene oligomer.

A copolymer refers to a product formed by two or more different monomers via polymerization, including random copolymers, alternating copolymers, graft copolymers, or block copolymers, but the present disclosure is not limited thereto. For instance, a styrene-butadiene copolymer is a product formed only by styrene and butadiene monomers via polymerization. For instance, the styrene-butadiene copolymer includes a styrene-butadiene random copolymer, a styrene-butadiene alternating copolymer, a styrene-butadiene graft copolymer, or a styrene-butadiene block copolymer, but the present disclosure is not limited thereto. The styrene-butadiene block copolymer includes, such as a polymerized molecular structure of styrene-styrene-styrene-butadiene-butadiene-butadiene-butadiene, but the present disclosure is not limited thereto. The styrene-butadiene block copolymer includes, such as a styrene-butadiene-styrene block copolymer, but the present disclosure is not limited thereto. The styrene-butadiene-styrene block copolymer includes, such as a polymerized molecular structure of styrene-styrene-styrene-butadiene-butadiene-butadiene-butadiene-styrene-styrene-styrene, but the present disclosure is not limited thereto. Similarly, a hydrogenated styrene-butadiene copolymer includes a hydrogenated styrene-butadiene random copolymer, a hydrogenated styrene-butadiene alternating copolymer, a hydrogenated styrene-butadiene graft copolymer, or a hydrogenated styrene-butadiene block copolymer. The hydrogenated styrene-butadiene block copolymer includes, such as a hydrogenated styrene-butadiene-styrene block copolymer, but the present disclosure is not limited thereto.

The term "resin" used herein includes monomer, polymer thereof, a combination of the monomer, a combination of the polymer, or a combination of the monomer and the polymer, but the present disclosure is not limited thereto. For instance, "maleimide resin" used herein includes a maleimide monomer, a maleimide polymer, a combination of maleimide monomers, a combination of maleimide polymers, or a combination of maleimide monomer(s) and maleimide polymer(s).

The term "vinyl group-containing" includes a vinyl group, a vinylbenzyl group, a vinylene group, an allyl group, or (meth)acrylate group.

A modification includes a product derived from a resin with its reactive functional group modified, a product derived from a prepolymerization reaction of a resin and other resins, a product derived from a crosslinking reaction of a resin and other resins, a product derived from a homopolymerization reaction of a resin, a product derived from a copolymerization reaction of a resin and other resins, and the like. For instance, a modification may refer to replacing a terminal hydroxyl group with a terminal vinyl group via a chemical reaction, or obtaining a terminal hydroxyl group via a chemical reaction of a terminal vinyl group and p-aminophenol.

The unsaturated bond used herein refer to a reactive unsaturated bond, such as an unsaturated bond with the potential of being cross-linked with other functional groups, such as an unsaturated carbon-carbon double bond with the potential of being cross-linked with other functional groups, but the present disclosure is not limited thereto.

When a specific example of a compound is expressed as "(substituent)", it includes both situations of containing and not containing this substituent. For instance, cyclohexane dimethanol di(meth)acrylate includes cyclohexane dimethanol diacrylate and cyclohexane dimethanol dimethacrylate, and (meth)acrylate includes acrylate and methacrylate.

An alkyl group used herein includes various isomers thereof. For instance, a propyl group includes n-propyl group and isopropyl group.

It should be understood that as long as there is no contradiction, each of the features of the embodiments disclosed herein may be individually or combinely combined with each other.

Part(s) by weight represents weight part(s) in any weight unit, such as kilogram, gram, pound and so on, but the present disclosure is not limited thereto. For instance, 100 parts by weight of the maleimide resin may represent 100 kilograms of the maleimide resin or 100 pounds of the maleimide resin. In the case that the resin solution includes solvent and resin, the part(s) by weight of the (solid or liquid) resin generally refers to the weight unit of the (solid or liquid) resin and does not include the weight unit of the solvent in the solution, while the part(s) by weight of the solvent refers to the weight unit of the solvent.

It should be understood that the embodiments described herein are exemplary in all aspects and are not intended to limit the scope of the present disclosure.

The present disclosure provides a resin composition, comprising: 100 parts by weight of resin A, comprising vinyl group-containing polyphenylene ether resin or maleimide resin; 5 parts by weight to 15 parts by weight of a compound having a structure represented by Formula (1); and 2 parts by weight to 15 parts by weight of compound B, comprising a compound having a structure represented by Formula (2), a compound having a structure represented by Formula (3) or a compound having a structure represented by Formula (4).

The compound having the structure represented by Formula (1) has a structure as follows:

Formula (1)

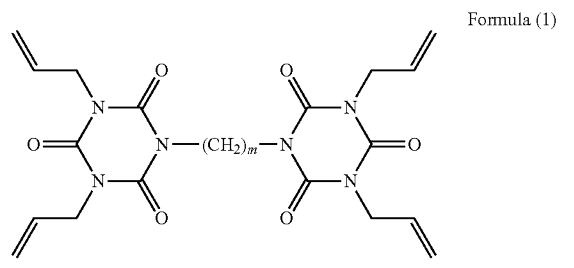

In Formula (1), m is an integer of 2 to 18, preferably an integer of 6 to 8.

The compound having the structure represented by Formula (2) has a structure as follows:

Formula (2)

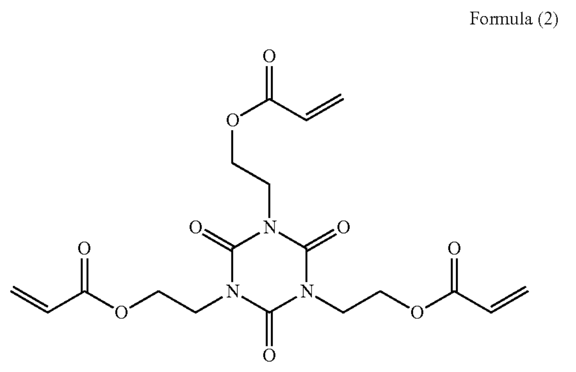 [SMILES: C=CC(=O)OCCn1c(=O)n(CCOC(=O)C=C)c(=O)n(CCOC(=O)C=C)c1=O]

The compound having the structure represented by Formula (3) has a structure as follows:

Formula (3)

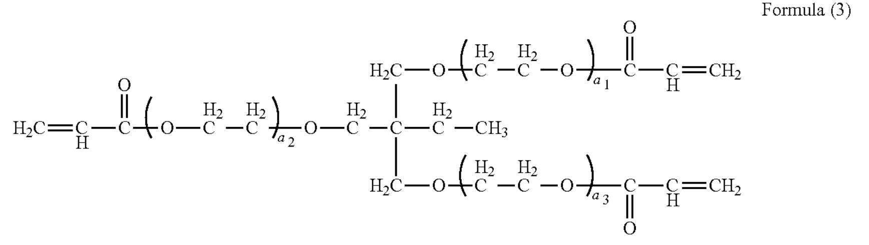

In Formula (3), each of $a_1$, $a_2$ and $a_3$ is independently an integer of 0 to 7.

The compound having the structure represented by Formula (4) has a structure as follows:

Formula (4)

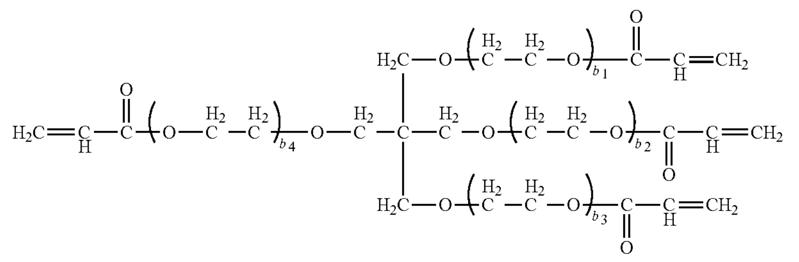

In Formula (4), each of $b_1$, $b_2$, $b_3$ and $b_4$ is independently an integer of 0 to 9.

The amount of the resin A in the resin composition is 100 parts by weight, and the amount of other components or additives is a relative amount with respect to 100 parts by weight of the resin A. For instance, if not specified, when 100 parts by weight of the resin A is 100 parts by weight of the vinyl group-containing polyphenylene ether resin, the amount of the compound having the structure represented by Formula (1) is 5 parts by weight to 15 parts by weight with respect to 100 parts by weight of the vinyl group-containing polyphenylene ether resin. For instance, in one exemplary embodiment of the present disclosure, the resin composition may include 100 kilograms of the vinyl group-containing polyphenylene ether resin and 5 kilograms to 15 kilograms of the compound having the structure represented by Formula (1). For instance, in one exemplary embodiment of the present disclosure, the resin composition may include 100 pounds of the vinyl group-containing polyphenylene ether resin and 5 pounds to 15 pounds of the compound having the structure represented by Formula (1). Similarly, when 100 parts by weight of the resin A is 100 parts by weight of the maleimide resin, the amount of the compound having the structure represented by Formula (2) is 2 parts by weight to 15 parts by weight with respect to 100 parts by weight of the maleimide resin. For instance, in one exemplary embodiment of the present disclosure, the resin composition may include 100 kilograms of the maleimide resin and 2 kilograms to 15 kilograms of the compound having the structure represented by Formula (2). For instance, in one exemplary embodiment of the present disclosure, the resin composition may include 100 pounds of the maleimide resin and 2 pounds to 15 pounds of the compound having the structure represented by Formula (2).

In one exemplary embodiment, 100 parts by weight of the resin A may be 100 parts by weight of the vinyl group-containing polyphenylene ether resin, 100 parts by weight of the maleimide resin, or a total amount of 100 parts by weight of the vinyl group-containing polyphenylene ether resin and the maleimide resin.

In one exemplary embodiment, the vinyl group-containing polyphenylene ether resin may include vinylbenzyl-containing polyphenylene ether resin or (meth)acrylate-containing polyphenylene ether resin, but the present disclosure is not limited thereto. The vinyl group-containing polyphenylene ether resin may undergo a polymerization reaction via its terminal vinyl group, that is an unsaturated carbon-carbon double bond.

In one exemplary embodiment, the vinyl group-containing polyphenylene ether resin may include various vinyl group-containing polyphenylene ether resins known in this field. The vinyl group-containing polyphenylene ether resin suitable for the present disclosure is not particularly limited and may be any one or more of commercial products. In some exemplary embodiments, one or more of the following vinyl group-containing polyphenylene ether resin may be used: vinylbenzyl-containing biphenyl polyphenylene ether resin (such as OPE-2st 1200 or OPE-2st 2200, available from MITSUBISHI GAS CHEMICAL COMPANY, INC.) or methacrylate-containing polyphenylene ether resin (such as SA9000, available from Sabic company). However, the vinyl group-containing polyphenylene ether resin of the present disclosure is not limited thereto.

In one exemplary embodiment, the maleimide resin may include a monomer having one or more maleimide group in the molecule, its polymer, or a combination thereof. If not specified, the maleimide resin suitable for the present disclosure is not particularly limited. In some exemplary embodiments, one or more of the following maleimide resin may be used: 4,4'-diphenylmethane bismaleimide, polyphenylmethane maleimide (or oligomer of phenylmethane maleimide), bisphenol A diphenyl ether bismaleimide, 3,3'-dimethyl-5,5'-diethyl-4,4'-diphenylmethane bismaleimide, 3,3'-dimethyl-5,5'-dipropyl-4,4'-diphenylmethane bismaleimide, m-phenylene bismaleimide, 4-methyl-1,3-phenylene bismaleimide, 1,6-bismaleimide-(2,2,4-trimethyl) hexane, N-2,3-xylylmaleimide, N-2,6-xylylmaleimide, N-phenylmaleimide, vinyl benzyl maleimide, biphenyl structure-containing maleimide, indane-containing maleimide, or an aliphatic long chain structure-containing maleimide (the aliphatic long chain structure is an aliphatic long chain with 10 to 50 of carbon).

For instance, the specific examples of the maleimide resin may include: the maleimide resin products BMI-1000, BMI-1000H, BMI-1100, BMI-1100H, BMI-2000, BMI-2300, BMI-3000, BMI-3000H, BMI-4000, BMI-5000, BMI-5100, BMI-TMH, BMI-7000 or BMI-7000H available from Daiwakasei Industry Co., Ltd.; the maleimide resin products BMI-70 or BMI-80 available from K.I Chemical Co., Ltd.; or the maleimide resin products MIR-3000 or MIR-5000 available from Nippon Kayaku, but the present disclosure is not limited thereto.

For instance, the specific examples of an aliphatic long chain structure-containing maleimide resin may include: the maleimide resin products BMI-689, BMI-1400, BMI-1500, BMI-1700, BMI-2500, BMI-3000, BMI-5000 or BMI-6000 available from Designer Molecules Inc, but the present disclosure is not limited thereto.

The compound having the structure represented by Formula (2), the compound having the structure represented by Formula (3) and the compound having the structure represented by Formula (4) all have at least three acrylate groups so that the three compounds have the same or similar function and have the same or similar technical effect while interchanging with each other.

The compound having the structure represented by Formula (3) is a monomer having three acrylate groups in the molecule. In one exemplary embodiment, each of $a_1$, $a_2$ and $a_3$ is independently an integer of 0 to 7. In one exemplary embodiment, each of $a_1$, $a_2$ and $a_3$ is independently an integer of 0 to 3. In one exemplary embodiment, each of $a_1$, $a_2$ and $a_3$ is preferably 0. In one exemplary embodiment, each of $a_1$, $a_2$ and $a_3$ is preferably 3. In another exemplary embodiment, each of $a_1$, $a_2$ and $a_3$ is independently an integer of 0 to 7, and the sum of $a_1$, $a_2$ and $a_3$ is 20.

In one exemplary embodiment, the compound having the structure represented by Formula (3) may include a compound having a structure represented by Formula (3-1):

Formula (3-1)

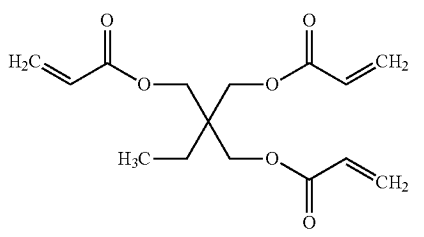

The compound having the structure represented by Formula (4) is a monomer having four acrylate groups in the molecule. In one exemplary embodiment, each of $b_1$, $b_2$, $b_3$ and $b_4$ is independently an integer of 0 to 9. In one exemplary embodiment, each of $b_1$, $b_2$, $b_3$ and $b_4$ is independently an integer of 0 to 3. In one exemplary embodiment, each of $b_1$, $b_2$, $b_3$ and $b_4$ is preferably 0. In one exemplary embodiment, each of $b_1$, $b_2$, $b_3$ and $b_4$ is preferably 3. In another exemplary embodiment, each of $b_1$, $b_2$, $b_3$ and $b_4$ is independently an integer of 0 to 9, and the sum of $b_1$, $b_2$, $b_3$ and $b_4$ is 35.

In one exemplary embodiment, the compound having the structure represented by Formula (4) may include a compound having a structure represented by Formula (4-1):

Formula (4-1)

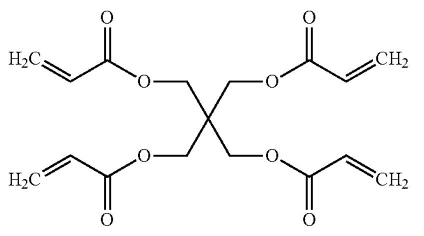

In one exemplary embodiment, the resin composition may further include resin C, and the resin C may include polyolefin resin, epoxy-containing acrylate resin, polyvinyl butyral resin, polyimide resin, phenoxy resin or a combination thereof. In one exemplary embodiment, with respect to 100 parts by weight of the resin A, the amount of the resin C may be 5 parts by weight to 20 parts by weight, but the present disclosure is not limited thereto.

In one exemplary embodiment, the polyolefin resin may include vinyl group-containing polyolefin, hydrogenated polyolefin or a combination thereof. In one exemplary embodiment, with respect to 100 parts by weight of the resin A, the amount of the polyolefin resin may be 0 part by weight to 20 parts by weight, but the present disclosure is not limited thereto. In another exemplary embodiment, the resin composition may not include polyolefin resin. That is, the amount of the polyolefin resin is 0 part by weight, which means no polyolefin resin is intentionally added to the resin composition.

In one exemplary embodiment, the vinyl group-containing polyolefin may include various vinyl group-containing polyolefins known in this field. For instance, the specific examples of the vinyl group-containing polyolefin may include: polybutadiene, polyisoprene, styrene-butadiene copolymer, styrene-butadiene-styrene block copolymer, styrene-isoprene copolymer, styrene-butadiene-divinylbenzene terpolymer, styrene-butadiene copolymer adducted with maleic anhydride, vinyl-polybutadiene-urethane oligomer, maleic anhydride adducted with polybutadiene or a combination thereof. For instance, the specific examples of the vinyl group-containing polyolefin may include: the vinyl group-containing polyolefin products Ricon 100, Ricon 150, Ricon 184MA6, Ricon 130MA10 or Ricon 257 available from Cray Valley; or the vinyl group-containing polyolefin products B-1000, B-2000 or B-3000 available from NIPPON SODA CO., LTD.

In one exemplary embodiment, when the resin composition includes the vinyl group-containing polyolefin, with respect to 100 parts by weight of the resin A, the amount of the vinyl group-containing polyolefin may be 1 part by weight to 20 parts by weight, preferably 1 part by weight to 10 parts by weight. In another exemplary embodiment, the resin composition may not include the vinyl group-containing polyolefin. That is, the amount of the vinyl group-containing polyolefin is 0 part by weight, which means no vinyl group-containing polyolefin is intentionally added to the resin composition. However, the present disclosure is not limited thereto, and the amount of the vinyl group-containing polyolefin may be adjusted as needed.

In one exemplary embodiment, the hydrogenated polyolefin may include various hydrogenated polyolefin known in this field. The hydrogenated polyolefin suitable for the present disclosure is not particularly limited and may be any one or more of commercial products, self-made products or a combination thereof. For instance, the hydrogenated polyolefin may include hydrogenated styrene-butadiene-styrene block copolymer (or styrene-ethylene/butene-styrene copolymers), maleic anhydride-substituted hydrogenated styrene-butadiene-styrene block copolymer or a combination thereof. That is, the hydrogenated polyolefin may include unsubstituted hydrogenated styrene-butadiene-styrene triblock copolymer, maleic anhydride-substituted hydrogenated styrene-butadiene-styrene triblock copolymer or a combination thereof. For instance, the specific examples of the hydrogenated polyolefin may include: the hydrogenated polyolefin products H1221, H1062, H1521, H1052, H1041, H1053, H1051, H1517, H1043, N504, H1272, M1943, M1911, M1913 or P1500 available from Asahi KASEI; the hydrogenated polyolefin products G1650, G1651, G1652, G1654, G1657, G1726, FG1901 or FG1924 from KRATON; or the hydrogenated polyolefin products 8004, 8006 or 8007L available from Kuraray.

In one exemplary embodiment, when the resin composition includes the hydrogenated polyolefin, such as the hydrogenated styrene-butadiene-styrene block copolymer resin, with respect to 100 parts by weight of the resin A, the amount of the hydrogenated polyolefin may be 0 part by weight to 20 parts by weight, and may also be 1 part by weight to 10 parts by weight. In another exemplary embodiment, the resin composition may not include the hydrogenated polyolefin. That is, the amount of the hydrogenated polyolefin is 0 part by weight, which means no hydrogenated polyolefin is intentionally added to the resin composition. However, the present disclosure is not limited thereto, and the amount of the hydrogenated polyolefin may be adjusted as needed.

In one exemplary embodiment, the epoxy-containing acrylate resin may be various epoxy-containing acrylate resins known in this field. The epoxy-containing acrylate resin suitable for the present disclosure is not particularly limited and may be any one or more of commercial products, self-made products or a combination thereof. For instance, the specific examples of the epoxy-containing acrylate resin may include the epoxy-containing acrylate resin products SG-P3, SG-80H or SG-80H-3 available from Nagase ChemteX.

In one exemplary embodiment, the polyvinyl butyral resin may include various polyvinyl butyral resins known in this field. For instance, the specific examples of the polyvinyl butyral resin may include: the polyvinyl butyral resin products B-72, B-74, B-76 or B-79 available from Eastman; or the polyvinyl butyral resin products KX-1, KW-1, KW-10, BL-1, BM-1 or BL-5 available from Sekisui Chemical (Taiwan) Co., Ltd.

In one exemplary embodiment, the polyimide resin may include various polyimide resins known in this field. For instance, the polyimide resin may include precursors of the polyimide resin (or polyimide precursor), and the polyimide resin may include polyamide resin, polyamic acid or polyamideimide resin, but the present disclosure is not limited thereto. For instance, the polyimide resin may be the polyamide acid precursor products UPIA-AT or UPIA-ST available from UBE Industries, Ltd.

In one exemplary embodiment, the phenoxy resin may include various phenoxy resins known in this field. The phenoxy resin suitable for the present disclosure is not particularly limited and may be any one or more of commercial products, self-made products or a combination thereof. For instance, the phenoxy resin suitable for the present disclosure may include: the phenoxy resin products PKHA, PKHB, PKHB+, PKHC, PKHH, PKHJ, PKFE, PKHP-200 or PKHW-34 available from Gabriel Company; product YP50S available from Nippon Steel Chemical & Material Co., Ltd.; or products FX-293 or FX-280 available from Tohto Chemical Industry Co., Ltd, but the present disclosure is not limited thereto.

In one exemplary embodiment, the resin composition may further include inorganic filler, silane coupling agent, inhibitor, flame retardant, coloring agent, toughening agent, core-shell rubber or solvent. The amount of the above components is not limited and may be used individually or in combination. In one exemplary embodiment, the amount of the above components may be 0 part by weight, and may also be 0.001 parts by weight to 400 parts by weight.

In one exemplary embodiment, the resin composition may further include the inorganic filler, and the amount of the inorganic filler is not limited. In one exemplary embodiment, the amount of the inorganic filler may be 1.1 times to 2.5 times of the total amount of the components other than the inorganic filler and the solvent in the resin composition. In other words, the resin composition may further include the inorganic filler in an amount of 1.1 times to 2.5 times of the total parts by weight of other components, and the other components refer to all components except for the inorganic filler and the solvent in the resin composition. However, the present disclosure is not limited thereto, and the amount of the inorganic filler may be adjusted as needed.

In one exemplary embodiment, the inorganic filler may be silica. In one exemplary embodiment, the inorganic filler may be spherical silica. In one exemplary embodiment, the spherical silica may include various spherical silica known in this field. For instance, the particle size distribution D50 of the spherical silica may be less than or equal to 2.0 μm. For instance, the particle size distribution D50 may be preferably between 0.2 μm and 2.0 μm, such as 0.2 μm, 0.3 μm, 0.4 μm, 0.5 μm, 0.6 μm, 0.8 μm, 1.2 μm, 1.3 μm or 2.0 μm. If not specified, the particle size distribution D50 refers to a particle size of the filler, such as spherical silica, measured by laser scattering when the cumulative volume percentage reaches 50%. The spherical silica suitable for the present disclosure is not particularly limited and may be any one or more of commercial products, such as the spherical silica available from Admatechs Company.

In one exemplary embodiment, the inorganic filler may be inorganic filler different from the spherical silica, and its amount may be adjusted as needed. In one exemplary embodiment, with respect to 100 parts by weight of the resin A, the amount of the inorganic filler different from the spherical silica may be 1 part by weight to 100 parts by weight.

In one exemplary embodiment, the inorganic filler different from the spherical silica may include non-spherical silica (i.e. irregular silica known in the field, wherein irregular means not spherical), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, ammonium molybdate, zinc molybdate-modified talc, zinc oxide, zirconium oxide, mica, boehmite (AlOOH), calcined talc, talc, silicon nitride or calcined kaolin. In addition, except for the non-spherical silica, other inorganic fillers may be spherical, fibrous, plate, particulate, flake or whisker.

In one exemplary embodiment, the inorganic filler may be optionally pretreated with a siloxane compound as needed. The amount of the siloxane compound for pretreating the inorganic filler is common knowledge in this field and is not described herein.

If not specified, the silane coupling agent suitable for the present disclosure may include silane, such as siloxane, and based on functional groups, the siloxane may be divided into amino silane, epoxide silane, vinyl silane, ester silane, hydroxyl silane, isocyanate silane, methacryloyloxyl silane or acryloyloxyl silane. The amount of the silane coupling agent is not limited, and the amount of the silane coupling agent may be adjusted depending on the dispersion of the inorganic filler in the resin composition.

In one exemplary embodiment, the resin composition may further include the inhibitor, and the amount of the inhibitor is not limited. In one exemplary embodiment, with respect to 100 parts by weight of the resin A, the amount of the inhibitor may be 0.01 parts by weight to 0.5 parts by weight, but the present disclosure is not limited thereto. When the resin composition includes the inhibitor, the amount of the inhibitor may be 0.01 parts by weight to 0.5 parts by weight, such as 0.02 parts by weight, 0.05 parts by weight, 0.2 parts by weight, 0.3 parts by weight, 0.45 parts by weight or 0.5 parts by weight. However, the present disclosure is not limited thereto, and the amount of the inhibitor may be adjusted as needed. In another exemplary embodiment, the resin composition may not include the inhibitor. That is, the amount of the inhibitor is 0 part by weight, which means no inhibitor is intentionally added to the resin composition.

If not specified, the inhibitor suitable for the present disclosure may be one or more inhibitor suitable for manufacturing a prepreg, a resin-coated copper, a laminate or a printed circuit board. The inhibitor may include various molecule type polymerization inhibitors or stable free radical type polymerization inhibitors known in this field. The molecule type polymerization inhibitor may include phenols, quinones, arylamines, arene nitro compounds, sulfur-containing compounds or chlorides of metal with variable valency, but the present disclosure is not limited thereto. For instance, the molecule type polymerization inhibitor may include phenol, hydroquinone, 4-tert-butylcatechol, benzoquinone, chloroquinone, 1,4-naphthoquinone, trimethylquinone, aniline, nitrobenzene, $Na_2S$, $FeCl_3$ or $CuCl_2$, but the present disclosure is not limited thereto. For instance, the stable free radical type polymerization inhibitor may include 1-diphenyl-2-picrylhydrazyl radical (DPPH), triphenylmethyl radical, 2,2,6,6-tetramethylpiperidine-1-oxide or derivatives of 2,2,6,6-tetramethylpiperidine-1-oxide, but the present disclosure is not limited thereto.

In one exemplary embodiment, the resin composition may further include the flame retardant. When the resin composition includes the flame retardant, with respect to 100 parts by weight of the resin A, the amount of the flame retardant may be 1 part by weight to 60 parts by weight, such as 1 part by weight, 5 parts by weight, 10 parts by weight, 20 parts by weight, 30 parts by weight, 40 parts by weight, 50 parts by weight or 60 parts by weight. However, the present disclosure is not limited thereto, and the amount of the flame retardant may be adjusted as needed. In another exemplary embodiment, the resin composition may not include the flame retardant. That is, the amount of the flame retardant is 0 part by weight, which means no flame retardant is intentionally added to the resin composition.

If not specified, the flame retardant suitable for the present disclosure may be one or more flame retardant suitable for manufacturing a prepreg, a resin-coated copper, a laminate or a printed circuit board, such as phosphorus-containing flame retardant, but the present disclosure is not limited thereto. For instance, the phosphorus-containing flame retardant may include ammonium polyphosphate, hydroquinone bis(diphenyl phosphate), bisphenol A bis(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate), resorcinol bis(di-2,6-dimethylphenyl phosphate) (such as commercial product PX-200)·hydroquinone bis(di-2,6-dimethylphenyl phosphate) (such as commercial product PX-201)·4,4'-biphenol bis(di-2,6-dimethylphenyl phosphate) (such as commercial product PX-202), phosphazene (such as commercial product SPB-100, SPH-100 or SPV-100), melamine polyphosphate, 9,10-dihydro-9-oxa-10-phosphaphenanthrene-10-oxide (DOPO) and its derivatives (such as di-DOPO compounds) or resins (such as DOPO-HQ, DOPO-NQ, DOPO-PN or DOPO-BPN), DOPO-bonding epoxy resin, diphenylphosphine oxide (DPPO) and its derivatives (such as di-DPPO compounds) or resins, melamine cyanurate, tri-hydroxyethyl isocyanurate or aluminium phosphinate (such as commercial products OP-930 or OP-935). Among them, DOPO-PN is DOPO-containing phenol novolac resin, and DOPO-BPN may be bisphenol novolac resin such as DOPO-BPAN (DOPO-bisphenol A novolac), DOPO-BPFN (DOPO-bisphenol F novolac) or DOPO-BPSN (DOPO-bisphenol S novolac).

In one exemplary embodiment, the amount of each of the coloring agent, the toughening agent and the core-shell rubber may be 0.01 parts by weight to 10 parts by weight, such as 0.01 parts by weight to 3 parts by weight or 0.05 parts by weight to 1 part by weight, but the present disclosure is not limited thereto. However, the present disclosure is not limited thereto, the amount of the above components may be adjusted as needed.

If not specified, the coloring agent suitable for the present disclosure may include dye or pigment, but the present disclosure is not limited thereto.

The main purpose of adding the toughening agent is to improve the toughness of the resin composition. If not specified, the toughening agent suitable for the present disclosure may include rubber, such as carboxyl-terminated butadiene acrylonitrile rubber (CTBN), but the present disclosure is not limited thereto.

If not specified, the core-shell rubber suitable for the present disclosure may include various commercially available core-shell rubbers.

The main purpose of adding the solvent is to dissolve the components in the resin composition, to modify the solid content of the resin composition, and to adjust the viscosity of the resin composition. For instance, the solvent may include methanol, ethanol, ethylene glycol monomethyl ether, acetone, butanone (i.e., methyl ethyl ketone), methyl isobutyl ketone, cyclohexanone, toluene, xylene, methoxyethyl acetate, ethoxyethyl acetate, propoxyethyl acetate, ethyl acetate, propylene glycol methyl ether, dimethyl formamide, dimethyl acetamide, N-methylpyrrolidone or a mixed solvent thereof, but the present disclosure is not limited thereto. The amount of the solvent is not limited and may be adjusted depending on the desired viscosity of the resin composition. In the case of adding the solvent to the resin composition, the solvent is evaporated and removed during heating the resin composition at high temperature to form a semi-cured state, and thus no solvent is present in the resin-coated copper, or only a trace amount of the solvent is present in the resin-coated copper.

The resin composition of one exemplary embodiment of the present disclosure may be made into various products including a resin-coated copper, a laminate or a printed circuit board via various processing ways, but the present disclosure is not limited thereto.

For instance, the resin composition of one exemplary embodiment of the present disclosure may be made into a resin-coated copper. For instance, the resin composition of one exemplary embodiment of the present disclosure is coated on a copper foil and then baked and heated to form the resin composition into a semi-cured state to prepare a resin-coated copper. The baking temperature may be between 95° C. and 150° C., preferably between 110° C. and 130° C., and the baking time may be 1 minute to 6 minutes, preferably 3 minutes to 5 minutes. The resin-coated copper may include a copper foil and a semi-cured resin layer attached to one side of the copper foil, and the semi-cured resin layer is prepared by forming the resin composition into a semi-cured state.

For instance, the resin-coated copper may further include a protective layer. That is, the resin-coated copper may include a copper foil, a semi-cured resin layer attached to one side of the copper foil, and a protective layer attached to the other side of the copper foil opposite to the semi-cured resin layer.

For instance, the copper foil of the resin-coated copper may be various copper foils known in this field, such as a high temperature elongation (HTE) copper foil, a reverse treated foil (RTF) copper foil, a RTF2 copper foil, a very low profile (VLP) copper foil, a hyper very low profile (HVLP) copper foil, a HVLP2 copper foil or a carrier-attached copper foil, but the present disclosure is not limited thereto. The thickness of the copper foil is not limited and may be a thickness of the copper foil commonly used in this field, such as Toz (ounce), Hoz, 1 oz or 2 oz, but the present disclosure is not limited thereto. The carrier-attached copper foil may be various carrier-attached copper foils known in this field, such as a carrier-attached copper foil including 18 μm of carrier and 3 μm of thin copper in which 3 μm of the thin copper is attached to 18 μm of the carrier. The specific examples of the carrier-attached copper foil may be a carrier-attached copper foil product MT18Ex available from Mitsui Kinzoku.

For instance, the resin composition of one exemplary embodiment of the present disclosure may be made into a laminate. For instance, the laminate may include at least two metal foils and at least one insulating layer, and the insulating layer is disposed between the two metal foils. The insulating layer may be prepared by curing the semi-cured resin composition to a compression stage (C-stage) at high temperature and high pressure known in this field. For instance, the semi-cured resin layers of each of the two resin-coated coppers are stacked toward each other while the copper foils of each of the two resin-coated copper are toward outside, and then they are cured and laminated at high temperature and high pressure to prepare a laminate. For instance, one copper foil is stacked on the side of the semi-cured resin layer of one resin-coated copper to make two copper foils being outside the semi-cured resin layer, and then they are cured and laminated at high temperature and high pressure to prepare a laminate. The suitable curing temperature may be between 190° C. and 230° C., preferably between 200° C. to 230° C. The suitable curing time may be 60 minutes to 300 minutes, preferably 100 minutes to 200 minutes. The suitable pressure may be between 200 psi and 500 psi, preferably between 250 psi and 400 psi. For instance, the insulating layer of the laminate may be prepared by curing and laminating the semi-cured resin layer of at least one resin-coated copper. The laminate may be copper clad laminate.

For instance, the laminate may be further made into a printed circuit board via a circuit process. The manufacturing method of the printed circuit board may be any well-known method.

For instance, the product made from the resin composition of one exemplary embodiment of the present disclosure may have at least one of the following properties:

a resin flow rate of copper-clad laminate as measured by reference to IPC-TM-650 2.3.17 of less than or equal to 10.0%, such as between 0.8% and 10.0%;

a X-axis coefficient of thermal expansion as measured by reference to IPC-TM-650 2.4.24.5 of less than or equal to 30 ppm/° C., such as between 22 ppm/° C. and 30 ppm/° C.;

a copper foil peeling strength as measured by reference to IPC-TM-650 2.4.8 of greater than or equal to 4.5 lb/in, such as between 4.7 lb/in and 5.3 lb/in;

a filling level of circuit-containing laminate of level 1; and a pattern at the edge of circuit-containing laminate of less than or equal to 10 mm, such as between 0 mm and 8 mm.

The chemicals used in Examples and Comparative Examples of the present disclosure are described as follows:

OPE-2st 1200: vinylbenzyl-containing biphenyl polyphenylene ether resin, commercially available.

OPE-2st 2200: vinylbenzyl-containing biphenyl polyphenylene ether resin, commercially available.

SA9000: methacrylate-containing polyphenylene ether resin, commercially available.

MIR-3000: biphenyl maleimide, commercially available.

BMI-70: bis(3-ethyl-5-methyl-4-maleimidophenyl) methane, commercially available.

BMI-2300: polyphenylmethane maleimide, commercially available.

MIR-5000: maleimide resin having a structure represented by Formula (5), commercially available. In Formula (5), $1 \leq n \leq 10$.

Formula (5)

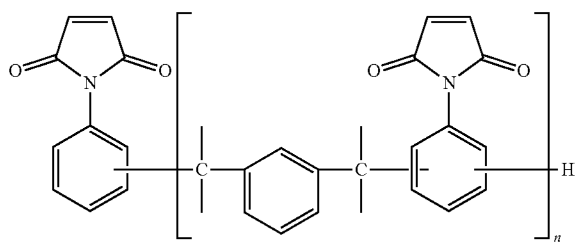

BMI-80: bisphenol A diphenyl ether bismaleimide resin, commercially available.

BMI-3000: maleimide resin having a structure represented by Formula (6), commercially available. In Formula (6), n is an integer of 1 to 10.

Formula (6)

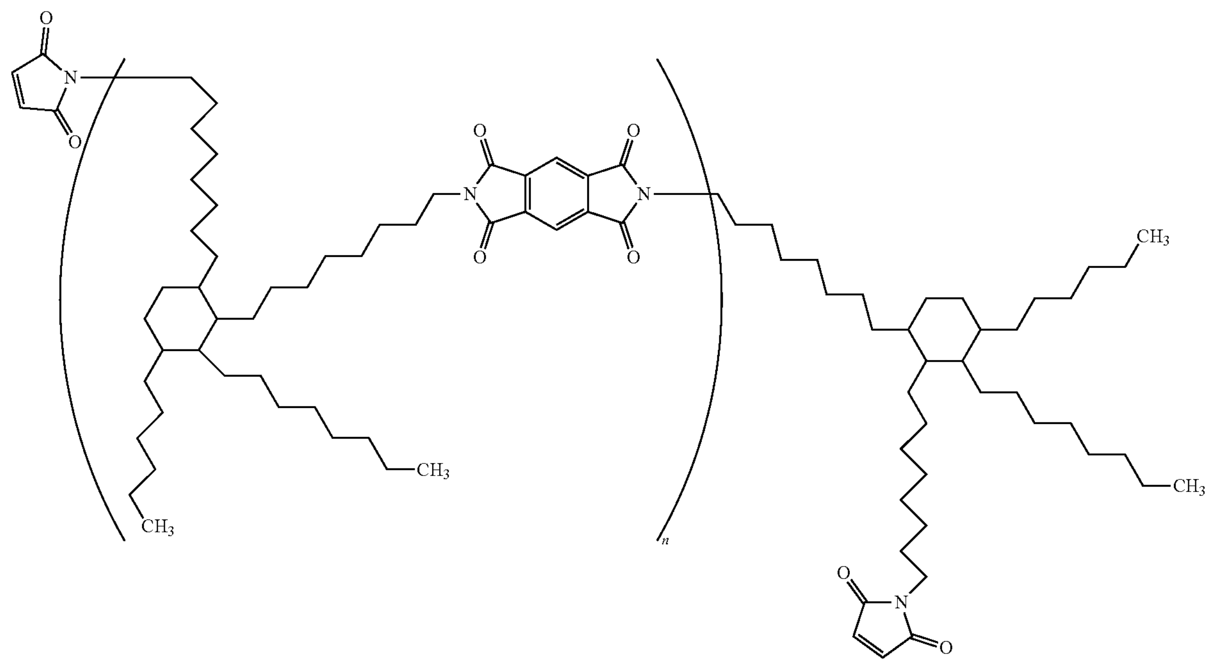

Compound of Formula (1): compound having a structure represented by Formula (1), referring to Synthesis Example 1. In Formula (1), m=6.

Formula (1)

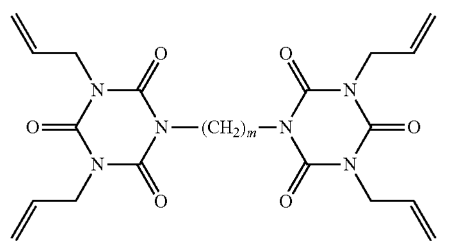

Compound of Formula (7): compound having a structure represented by Formula (7), commercially available.

Formula (7)

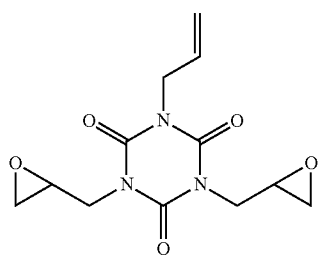

TAC: triallyl cyanurate, commercially available.

TAIC: triallyl isocyanurate, commercially available.

Compound of Formula (2): compound having a structure represented by Formula (2), tris(2-hydroxyethyl) isocyanurate triacrylate, commercially available.

Compound of Formula (3-1): compound having a structure represented by Formula (3-1), trimethylolpropane triacrylate, commercially available.

Compound of Formula (4-1): compound having a structure represented by Formula (4-1), pentaerythritol tetraacrylate, commercially available.

Compound of Formula (8): compound having a structure represented by Formula (8), tricyclodecanedimethanol diacrylate, commercially available.

Formula (8)

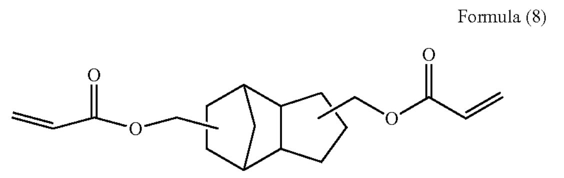

Compound of Formula (9): compound having a structure represented by Formula (9), dodecyl methacrylate, commercially available.

Formula (9)

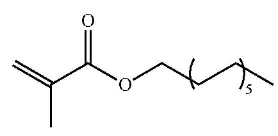

Compound of Formula (10): compound having a structure represented by Formula (10), diethylene glycol dimethacrylate, commercially available.

Formula (10)

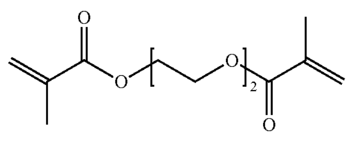

Compound of Formula (11): compound having a structure represented by Formula (11), 1,6-hexanediol diacrylate, commercially available.

Formula (11)

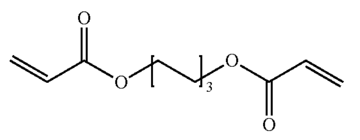

Ricon 184MA6: styrene-butadiene copolymer adducted with maleic anhydride, commercially available.
Ricon 150: polybutadiene, commercially available.
Ricon 100: styrene-butadiene copolymer, commercially available.
Ricon 257: styrene-butadiene-divinylbenzene terpolymer, commercially available.
ASAPRENE T439: styrene-butadiene-styrene block copolymer, commercially available.
H1043: hydrogenated styrene-butadiene-styrene block copolymer, commercially available.
P1500: hydrogenated styrene-butadiene-styrene block copolymer, commercially available.
SG-P3: epoxy-containing acrylate resin, commercially available.
PVB: polyvinyl butyral, commercially available.
UPIA-AT: polyimide resin precursor, commercially available.
YP-50: phenoxy resin, commercially available.
SC2050 SVJ: spherical silica treated with silane coupling agent, commercially available.
SC2050 SXJ: spherical silica treated with silane coupling agent, commercially available.
butanone and toluene: commercially available.

Synthesis Example 1

400 mL of N,N-dimethyl formamide (DMF) and 60 g (0.286 moles) of unmodified diallyl isocyanate are added to a reactor and stirred to dissolve the unmodified diallyl isocyanate to DMF. Then, 39.5 g (0.286 moles) of potassium carbonate and 34.9 g (0.143 moles) of 1,6-dibromohexane are added to the reactor, raised to 120° C. and stirred at constant temperature for 6 hours, and then cooled to room temperature.

The solution is filtered. DMP is removed from the filtrate, and the remaining is then dissolved in 400 mL of ethyl acetate and extracted with 200 mL of deionized water, 200 mL of 5 v/v % hydrochloric acid and 200 mL of saturated sodium chloride solution in sequence. The obtained organic solution is dried with magnesium sulfate and filtered, and then all solvent is removed therefrom to obtain the compound having the structure represented by Formula (1).

The resin compositions of Examples and Comparative Examples of the present disclosure are prepared according to the amount of the chemicals listed in Tables 1 to 7 and further made into various samples.

In the tables, "R" represents the amount of the inorganic filler in the resin composition of each of Examples and Comparative Examples is R times of the total amount of other components. In other words, the amount of the inorganic filler is R times of the total amount of the other components other than the inorganic filler and the solvent in the resin composition. In the Table, "R*2" represents the amount of the inorganic filler is 2 times of R. For instance, R*2 in Example E1 represents the amount of the inorganic filler is 250 parts by weight. (Since the total amount of the other components other than the inorganic filler and the solvent is 125 parts by weight, the amount of the inorganic filler in Example E1 is 2 times of 125 parts by weight, that is 250 parts by weight.)

TABLE 1 the content of the resin composition of Examples E1 to E4 (in parts by weight)

| Component | Type | Chemical | E1 | E2 | E3 | E4 |
|---|---|---|---|---|---|---|
| polyphenylene ether | vinyl group-containing polyphenylene ether | OPE-2st 1200 | 100 | 70 | 100 | 100 |
| | | OPE-2st 2200 | — | — | — | — |
| | | SA9000 | — | — | — | — |
| maleimide resin | aromatic maleimide resin | MIR-3000 | — | 30 | — | — |
| | | BMI-70 | — | — | — | — |
| | | BMI-2300 | — | — | — | — |
| | | MIR-5000 | — | — | — | — |
| | | BMI-80 | — | — | — | — |
| | aliphatic long chain-containing maleimide resin | BMI-3000 | — | — | — | — |
| allyl-containing cyanurate | | Compound of Formula (1) | 10 | 10 | 15 | 5 |
| | | Compound of Formula (7) | — | — | — | — |
| | | TAC | — | — | — | — |
| | | TAIC | — | — | — | — |

TABLE 1-continued

| the content of the resin composition of Examples E1 to E4 (in parts by weight) | | | | | | |
|---|---|---|---|---|---|---|
| acrylate-containing compound | trifunctional acrylate | Compound of Formula (2) | 10 | 10 | 5 | 15 |
| | | Compound of Formula (3-1) | — | — | — | — |
| | tetrafunctional acrylate | Compound of Formula (4-1) | — | — | — | — |
| | bifunctional acrylate | Compound of Formula (8) | — | — | — | — |
| | monofunctional acrylate | Compound of Formula (9) | — | — | — | — |
| | bifunctional acrylate | Compound of Formula (10) | — | — | — | — |
| | | Compound of Formula (11) | — | — | — | — |
| resin C | polyolefin resin | Ricon 184MA6 | 5 | 5 | 5 | 5 |
| | | Ricon 150 | — | — | — | — |
| | | Ricon 100 | — | — | — | — |
| | | Ricon 257 | — | — | — | — |
| | | ASAPRENE T439 | — | — | — | — |
| | | H1043 | — | — | — | — |
| | | P1500 | — | — | — | — |
| | epoxy-containing acrylate resin | SG-P3 | — | — | — | — |
| | polyvinyl butyral | PVB | — | — | — | — |
| | polyimide resin | UPIA-AT | — | — | — | — |
| | phenoxy resin | YP-50 | — | — | — | — |
| inorganic filler | | SC2050 SVJ | R*2 | R*2 | R*2 | R*2 |
| | | SC2050 SXJ | — | — | — | — |
| solvent | | Butanone | 50 | 50 | 50 | 50 |
| | | Toluene | 50 | 50 | 50 | 50 |

| Property | Unit | E1 | E2 | E3 | E4 |
|---|---|---|---|---|---|
| Resin flow 1 | % | 55.2 | 53.2 | 57.6 | 51.5 |
| Resin flow 2 | % | 52.8 | 52.8 | 54.3 | 48.8 |
| Resin flow rate of copper-clad laminate | % | 4.3% | 0.8% | 5.7% | 5.2% |
| Filling level of circuit-containing laminate | — | Level 1 | Level 1 | Level 1 | Level 1 |
| Pattern at the edge of circuit-containing laminate | mm | 0 | 1 | 3 | 0 |
| X-axis coefficient of thermal expansion | ppm/° C. | 25 | 23 | 26 | 22 |
| Copper foil peeling strength | lb/in | 4.8 | 5.1 | 4.9 | 5.0 |

TABLE 2

| the content of the resin composition of Examples E5 to E8 (in parts by weight) | | | | | | |
|---|---|---|---|---|---|---|
| Component | Type | Chemical | E5 | E6 | E7 | E8 |
| polyphenylene ether | vinyl group-containing polyphenylene ether | OPE-2st 1200 | 30 | — | 100 | — |
| | | OPE-2st 2200 | — | 80 | — | — |
| | | SA9000 | 30 | 20 | — | — |
| maleimide resin | aromatic maleimide resin | MIR-3000 | 30 | — | — | 85 |
| | | BMI-70 | 10 | — | — | 15 |
| | | BMI-2300 | — | — | — | — |
| | | MIR-5000 | — | — | — | — |
| | | BMI-80 | — | — | — | — |
| | aliphatic long chain-containing maleimide resin | BMI-3000 | — | — | — | — |

TABLE 2-continued

| the content of the resin composition of Examples E5 to E8 (in parts by weight) | | | | | | |
|---|---|---|---|---|---|---|
| allyl-containing cyanurate | | Compound of Formula (1) | 5 | 10 | 10 | 10 |
| | | Compound of Formula (7) | — | — | — | — |
| | | TAC | — | — | — | — |
| | | TAIC | — | — | — | — |
| acrylate-containing compound | trifunctional acrylate | Compound of Formula (2) | 5 | 2 | — | 10 |
| | | Compound of Formula (3-1) | — | — | 5 | — |
| | tetra-functional acrylate | Compound of Formula (4-1) | — | — | 5 | — |
| | bifunctional acrylate | Compound of Formula (8) | — | — | — | — |
| | mono-functional acrylate | Compound of Formula (9) | — | — | — | — |
| | bifunctional acrylate | Compound of Formula (10) | — | — | — | — |
| | | Compound of Formula (11) | — | — | — | — |

TABLE 2-continued the content of the resin composition of Examples E5 to E8 (in parts by weight)

| | | | | | | |
|---|---|---|---|---|---|---|
| resin C | polyolefin resin | Ricon 184MA6 | 5 | 5 | 5 | 5 |
| | | Ricon 150 | 2 | — | — | — |
| | | Ricon 100 | 3 | — | — | — |
| | | Ricon 257 | — | — | — | — |
| | | ASAPRENE T439 | — | — | — | — |
| | | H1043 | 10 | — | — | — |
| | | P1500 | — | — | — | — |
| | epoxy-containing acrylate resin | SG-P3 | — | — | — | — |
| | polyvinyl butyral | PVB | — | — | — | — |
| | polyimide resin | UPIA-AT | — | — | — | — |
| | phenoxy resin | YP-50 | — | — | — | — |
| inorganic filler | | SC2050 SVJ | R*1.8 | R*2 | R*2 | R*2 |
| | | SC2050 SXJ | R*0.7 | — | — | — |
| solvent | | Butanone | 300 | 50 | 50 | 50 |
| | | Toluene | 100 | 50 | 50 | 50 |

| Property | Unit | E5 | E6 | E7 | E8 |
|---|---|---|---|---|---|
| Resin flow 1 | % | 50.7 | 55.2 | 42.5 | 47.3 |
| Resin flow 2 | % | 49.5 | 52.4 | 40.8 | 46.1 |
| Resin flow rate of copper-clad laminate | % | 2.4 | 5.1 | 4.0 | 2.5 |
| Filling level of circuit-containing laminate | — | Level 1 | Level 1 | Level 1 | Level 1 |
| Pattern at the edge of circuit-containing laminate | mm | 3 | 5 | 8 | 2 |
| X-axis coefficient of thermal expansion | ppm/° C. | 23 | 26 | 22 | 22 |
| Copper foil peeling strength | lb/in | 5.3 | 5.2 | 4.7 | 4.9 |

TABLE 3 the content of the resin composition of Examples E9 to E12 (in parts by weight)

| Component | Type | Chemical | E9 | E10 | E11 | E12 |
|---|---|---|---|---|---|---|
| poly-phenylene ether | vinyl group-containing poly-phenylene ether | OPE-2st 1200 | 70 | 70 | 70 | 60 |
| | | OPE-2st 2200 | — | — | — | — |
| | | SA9000 | 15 | 15 | 15 | 10 |
| maleimide resin | aromatic maleimide resin | MIR-3000 | 7.5 | — | — | 15 |
| | | BMI-70 | 7.5 | — | — | 15 |
| | | BMI-2300 | — | — | — | — |
| | | MIR-5000 | — | — | — | — |
| | | BMI-80 | — | — | 7.5 | — |
| | aliphatic long chain-containing maleimide resin | BMI-3000 | — | 15 | 7.5 | — |
| allyl-containing cyanurate | | Compound of Formula (1) | 10 | 10 | 10 | 10 |
| | | Compound of Formula (7) | — | — | — | — |
| | | TAC | — | — | — | — |
| | | TAIC | — | — | — | — |

TABLE 3-continued the content of the resin composition of Examples E9 to E12 (in parts by weight)

| | | | | | | |
|---|---|---|---|---|---|---|
| acrylate-containing compound | trifunctional acrylate | Compound of Formula (2) | 10 | 10 | 10 | 7 |
| | | Compound of Formula (3-1) | — | — | — | 3 |
| | tetra-functional acrylate | Compound of Formula (4-1) | — | — | — | — |
| | bifunctional acrylate | Compound of Formula (8) | — | — | — | — |
| | mono-functional acrylate | Compound of Formula (9) | — | — | — | — |
| | bifunctional acrylate | Compound of Formula (10) | — | — | — | — |
| | | Compound of Formula (11) | — | — | — | — |
| resin C | polyolefin resin | Ricon 184MA6 | 5 | 5 | 5 | 3 |
| | | Ricon 150 | — | — | — | — |
| | | Ricon 100 | — | — | — | — |
| | | Ricon 257 | — | — | — | 2 |
| | | ASAPRENE T439 | — | — | — | 2 |
| | | H1043 | — | — | — | 5 |
| | | P1500 | — | — | — | — |
| | epoxy-containing acrylate resin | SG-P3 | — | — | — | — |
| | polyvinyl butyral | PVB | — | — | — | — |
| | polyimide resin | UPIA-AT | — | — | — | — |
| | phenoxy resin | YP-50 | — | — | — | — |
| inorganic filler | | SC2050 SVJ | R*2 | R*2 | R*2 | R*0.6 |
| | | SC2050 SXJ | — | — | — | R*1.5 |
| solvent | | Butanone | 50 | 50 | 50 | 50 |
| | | Toluene | 50 | 50 | 50 | 150 |

| Property | Unit | E9 | E10 | E11 | E12 |
|---|---|---|---|---|---|
| Resin flow 1 | % | 58.1 | 60.2 | 55.8 | 46.2 |
| Resin flow 2 | % | 54.2 | 56.5 | 50.2 | 43.1 |
| Resin flow rate of copper-clad laminate | % | 6.7 | 6.1 | 10.0 | 6.7 |
| Filling level of circuit-containing laminate | — | Level 1 | Level 1 | Level 1 | Level 1 |
| Pattern at the edge of circuit-containing laminate | mm | 4 | 5 | 5 | 0 |
| X-axis coefficient of thermal expansion | ppm/° C. | 25 | 30 | 24 | 25 |
| Copper foil peeling strength | lb/in | 5.0 | 5.2 | 4.9 | 5.2 |

TABLE 4 the content of the resin composition of Examples E13 to E15 (in parts by weight)

| Component | Type | Chemical | E13 | E14 | E15 |
|---|---|---|---|---|---|
| poly-phenylene ether | vinyl group-containing polyphenylene ether | OPE-2st 1200 | 30 | 30 | 30 |
| | | OPE-2st 2200 | — | 30 | 30 |
| | | SA9000 | — | 40 | 40 |
| maleimide resin | aromatic maleimide resin | MIR-3000 | 40 | — | — |
| | | BMI-70 | 10 | — | — |
| | | BMI-2300 | 5 | — | — |
| | | MIR-5000 | 15 | — | — |

TABLE 4-continued the content of the resin composition of Examples E13 to E15 (in parts by weight)

| Component | Type | Chemical | E13 | E14 | E15 |
|---|---|---|---|---|---|
| | | BMI-80 | — | — | — |
| | aliphatic long chain-containing maleimide resin | BMI-3000 | — | — | — |
| allyl-containing cyanurate | | Compound of Formula (1) | 10 | 10 | 10 |
| | | Compound of Formula (7) | — | — | — |
| | | TAC | — | — | — |
| | | TAIC | — | — | — |
| acrylate-containing compound | trifunctional acrylate | Compound of Formula (2) | 5 | 10 | 10 |
| | | Compound of Formula (3-1) | 4 | — | — |
| | tetrafunctional acrylate | Compound of Formula (4-1) | 1 | — | — |
| | bifunctional acrylate | Compound of Formula (8) | — | — | — |
| | monofunctional acrylate | Compound of Formula (9) | — | — | — |
| | bifunctional acrylate | Compound of Formula (10) | — | — | — |
| | | Compound of Formula (11) | — | — | — |
| resin C | polyolefin resin | Ricon 184MA6 | 1 | — | — |
| | | Ricon 150 | — | — | — |
| | | Ricon 100 | — | — | — |
| | | Ricon 257 | — | — | — |
| | | ASAPRENE T439 | — | — | — |
| | | H1043 | 3 | — | — |
| | | P1500 | 1 | — | — |
| | epoxy-containing acrylate resin | SG-P3 | — | 2 | — |
| | polyvinyl butyral | PVB | — | — | 1 |
| | polyimide resin | UPIA-AT | — | — | 1 |
| | phenoxy resin | YP-50 | — | — | 1 |
| inorganic filler | | SC2050 SVJ | R*1.1 | R*2 | R*2 |
| | | SC2050 SXJ | — | — | — |
| solvent | | Butanone | 70 | 50 | 50 |
| | | Toluene | 30 | 50 | 50 |
| Property | | Unit | E13 | E14 | E15 |
| Resin flow 1 | | % | 50.1 | 54.8 | 51.4 |
| Resin flow 2 | | % | 49.2 | 51.8 | 49.2 |
| Resin flow rate of copper-clad laminate | | % | 1.8 | 5.5 | 4.3 |
| Filling level of circuit-containing laminate | | — | Level 1 | Level 1 | Level 1 |
| Pattern at the edge of circuit-containing laminate | | mm | 3 | 5 | 5 |
| X-axis coefficient of thermal expansion | | ppm/° C. | 25 | 27 | 27 |
| Copper foil peeling strength | | lb/in | 5.0 | 4.9 | 5.1 |

TABLE 5 the content of the resin composition of Comparative Examples C1 to C4 (in parts by weight)

| Component | Type | Chemical | C1 | C2 | C3 | C4 |
|---|---|---|---|---|---|---|
| poly-phenylene ether | vinyl group-containing poly-phenylene ether | OPE-2st 1200 | 100 | 100 | 100 | 100 |
| | | OPE-2st 2200 | — | — | — | — |
| | | SA9000 | — | — | — | — |

TABLE 5-continued the content of the resin composition of Comparative Examples C1 to C4 (in parts by weight)

| Component | Type | Chemical | C1 | C2 | C3 | C4 |
|---|---|---|---|---|---|---|
| maleimide resin | aromatic maleimide resin | MIR-3000 | — | — | — | — |
| | | BMI-70 | — | — | — | — |
| | | BMI-2300 | — | — | — | — |
| | | MIR-5000 | — | — | — | — |
| | | BMI-80 | — | — | — | — |
| | aliphatic long chain-containing maleimide resin | BMI-3000 | — | — | — | — |
| allyl-containing cyanurate | | Compound of Formula (1) | 20 | — | — | — |
| | | Compound of Formula (7) | — | — | — | — |
| | | TAC | — | — | — | 5 |
| | | TAIC | — | — | 10 | 15 |
| acrylate-containing compound | trifunctional acrylate | Compound of Formula (2) | — | 20 | 10 | — |
| | | Compound of Formula (3-1) | — | — | — | — |
| | tetra-functional acrylate | Compound of Formula (4-1) | — | — | — | — |
| | bifunctional acrylate | Compound of Formula (8) | — | — | — | — |
| | mono-functional acrylate | Compound of Formula (9) | — | — | — | — |
| | bifunctional acrylate | Compound of Formula (10) | — | — | — | — |
| | | Compound of Formula (11) | — | — | — | — |
| resin C | polyolefin resin | Ricon 184MA6 | 5 | 5 | 5 | 5 |
| | | Ricon 150 | — | — | — | — |
| | | Ricon 100 | — | — | — | — |
| | | Ricon 257 | — | — | — | — |
| | | ASAPRENE T439 | — | — | — | — |
| | | H1043 | — | — | — | — |
| | | P1500 | — | — | — | — |
| | epoxy-containing acrylate resin | SG-P3 | — | — | — | — |
| | polyvinyl butyral | PVB | — | — | — | — |
| | polyimide resin | UPIA-AT | — | — | — | — |
| | phenoxy resin | YP-50 | — | — | — | — |
| inorganic filler | | SC2050 SVJ | R*2 | R*2 | R*2 | R*2 |
| | | SC2050 SXJ | — | — | — | — |
| solvent | | Butanone | 50 | 50 | 50 | 50 |
| | | Toluene | 50 | 50 | 50 | 50 |
| Property | | Unit | C1 | C2 | C3 | C4 |
| Resin flow 1 | | % | 52.3 | 51.6 | 52.5 | 58.4 |
| Resin flow 2 | | % | 40.8 | 46.9 | 42.1 | 49.6 |
| Resin flow rate of copper-clad laminate | | % | 22.0 | 9.1 | 19.8 | 15.1 |
| Filling level of circuit-containing laminate | | — | Level 2 | Level 3 | Level 1 | Level 1 |
| Pattern at the edge of circuit-containing laminate | | mm | 22 | 13 | 30 | 40 |
| X-axis coefficient of thermal expansion | | ppm/° C. | 36 | 29 | 28 | 28 |
| Copper foil peeling strength | | lb/in | 4.7 | 4.0 | 4.6 | 4.2 |

TABLE 6

| the content of the resin composition of Comparative Examples C5 to C8 (in parts by weight) | | | | | | |
|---|---|---|---|---|---|---|
| Component | Type | Chemical | C5 | C6 | C7 | C8 |
| polyphenylene ether | vinyl group-containing polyphenylene ether | OPE-2st 1200 | 100 | 100 | 100 | 100 |
| | | OPE-2st 2200 | — | — | — | — |
| | | SA9000 | — | — | — | — |
| maleimide resin | aromatic maleimide resin | MIR-3000 | — | — | — | — |
| | | BMI-70 | — | — | — | — |
| | | BMI-2300 | — | — | — | — |
| | | MIR-5000 | — | — | — | — |
| | | BMI-80 | — | — | — | — |
| | aliphatic long chain-containing maleimide resin | BMI-3000 | — | — | — | — |
| allyl-containing cyanurate | | Compound of Formula (1) | 10 | 10 | 10 | 10 |
| | | Compound of Formula (7) | 5 | — | — | — |
| | | TAC | — | — | — | — |
| | | TAIC | — | — | — | — |
| acrylate-containing compound | trifunctional acrylate | Compound of Formula (2) | — | — | — | — |
| | | Compound of Formula (3-1) | — | — | — | — |
| | tetra-functional acrylate | Compound of Formula (4-1) | — | — | — | — |
| | bifunctional acrylate | Compound of Formula (8) | — | 5 | — | 2 |
| | mono-functional acrylate | Compound of Formula (9) | — | — | — | — |
| | bifunctional acrylate | Compound of Formula (10) | — | — | — | — |
| | | Compound of Formula (11) | — | — | 5 | — |
| resin C | polyolefin resin | Ricon 184MA6 | 5 | 5 | 5 | 5 |
| | | Ricon 150 | — | — | — | — |
| | | Ricon 100 | — | — | — | — |
| | | Ricon 257 | — | — | — | — |
| | | ASAPRENE T439 | — | — | — | — |
| | | H1043 | — | — | — | — |
| | | P1500 | — | — | — | — |
| | epoxy-containing acrylate resin | SG-P3 | — | — | — | — |
| | polyvinyl butyral | PVB | — | — | — | — |
| | polyimide resin | UPIA-AT | — | — | — | — |
| | phenoxy resin | YP-50 | — | — | — | — |
| inorganic filler | | SC2050 SVJ | R*2 | R*2 | R*2 | R*2 |
| | | SC2050 SXJ | — | — | — | — |
| solvent | | Butanone | 50 | 50 | 50 | 50 |
| | | Toluene | 50 | 50 | 50 | 50 |
| Property | | Unit | C5 | C6 | C7 | C8 |
| Resin flow 1 | | % | 56.9 | 53.6 | 55.1 | 49.0 |
| Resin flow 2 | | % | 32.2 | 37.8 | 40.5 | 37.2 |
| Resin flow rate of copper-clad laminate | | % | 43.4 | 29.5 | 26.5 | 24.1 |
| Filling level of circuit-containing laminate | | — | Level 1 | Level 3 | Level 3 | Level 2 |
| Pattern at the edge of circuit-containing laminate | | mm | 25 | 20 | 9 | 15 |
| X-axis coefficient of thermal expansion | | ppm/° C. | 34 | 29 | 35 | 36 |
| Copper foil peeling strength | | lb/in | 4.8 | 3.5 | 4.5 | 3.5 |

TABLE 7

| the content of the resin composition of Comparative Example C9 (in parts by weight) | | | |
|---|---|---|---|
| Component | Type | Chemical | C9 |
| polyphenylene ether | vinyl group-containing polyphenylene ether | OPE-2st 1200 | 100 |
| | | OPE-2st 2200 | — |
| | | SA9000 | — |
| maleimide resin | aromatic maleimide resin | MIR-3000 | — |
| | | BMI-70 | — |
| | | BMI-2300 | — |
| | | MIR-5000 | — |
| | | BMI-80 | — |
| | aliphatic long chain-containing maleimide resin | BMI-3000 | — |
| allyl-containing cyanurate | | Compound of Formula (1) | — |
| | | Compound of Formula (7) | 5 |
| | | TAC | — |
| | | TAIC | 5 |
| acrylate-containing compound | trifunctional acrylate | Compound of Formula (2) | — |
| | | Compound of Formula (3-1) | — |
| | tetrafunctional acrylate | Compound of Formula (4-1) | — |
| | bifunctional acrylate | Compound of Formula (8) | 1 |
| | monofunctional acrylate | Compound of Formula (9) | 4 |
| | bifunctional acrylate | Compound of Formula (10) | 3 |
| | | Compound of Formula (11) | 2 |
| resin C | polyolefin resin | Ricon 184MA6 | 5 |
| | | Ricon 150 | — |
| | | Ricon 100 | — |
| | | Ricon 257 | — |
| | | ASAPRENE T439 | — |
| | | H1043 | — |
| | | P1500 | — |
| | epoxy-containing acrylate resin | SG-P3 | — |
| | polyvinyl butyral | PVB | — |
| | polyimide resin | UPIA-AT | — |
| | phenoxy resin | YP-50 | — |
| inorganic filler | | SC2050 SVJ | R*2 |
| | | SC2050 SXJ | — |
| solvent | | Butanone | 50 |
| | | Toluene | 50 |
| Property | | Unit | C9 |
| Resin flow 1 | | % | 47.3 |
| Resin flow 2 | | % | 38.6 |
| Resin flow rate of copper-clad laminate | | % | 18.4 |
| Filling level of circuit-containing laminate | | — | Level 3 |
| Pattern at the edge of circuit-containing laminate | | mm | 15 |
| X-axis coefficient of thermal expansion | | ppm/° C. | 28 |
| Copper foil peeling strength | | lb/in | 4.3 |

Varnish

According to the amount of the chemicals listed in Tables 1 to 7, the components of each of Examples (abbreviated as E, such as E1 to E15) and Comparative Examples (abbreviated as C, such as C1 to C9) are added to a stirrer for stirring and well-mixing to form a resin varnish.

5 For instance, in Example E1, 100 parts by weight of OPE-2st 1200, 10 parts by weight of Compound of Formula (1), 10 parts by weight of Compound of Formula (2) and 5 parts by weight of Ricon 184MA6 are added to a stirrer containing 50 parts by weight of toluene solvent and 50 parts by weight of butanone solvent and stirred until completely dissolved and well-mixed. Then, 250 parts by weight of SC2050 SVJ is added to the stirrer and stirred until well-mixed to obtain a varnish of the resin composition E1.

In addition, according to the amount of the chemicals listed in Tables 1 to 7 and the preparation method of the varnish of Example E1, the varnishes of Examples E2 to E15 and Comparative Examples $C_1$ to $C_9$ are prepared.

According to the method below, samples (resin-coated coppers, copper-clad laminates and copper-free laminates) are prepared using the varnishes of Examples E1 to E15 and Comparative Examples $C_1$ to $C_9$ and tested for properties under the specified conditions as follows.

Resin-Coated Copper

The resin compositions of Examples E1 to E15 and Comparative Examples C1 to C9 are used and respectively added to a stirrer for well-mixing to form a varnish. The varnish is evenly coated on RTF (Toz) copper foil, heated and baked at 120° C. for 5 minutes to form a semi-cured resin layer so as to obtain a resin-coated copper. The thickness of the semi-cured resin layer of the resin-coated copper is 70 μm.

Copper-Clad Laminate 1 (Formed by Laminating Two Resin-Coated Coppers)

For each of Examples and Comparative Examples, two resin-coated coppers freshly made using the above method are prepared. The two resin-coated coppers are stacked, in which the semi-cured resin layers of the two resin-coated coppers are adjacent inside and the copper foils of the two resin-coated coppers are outside. In a laminator in a vacuum environment, the two resin-coated coppers are laminated for 2 hours with a lamination pressure of 300 psi and a lamination temperature of 220° C. to form a copper-clad laminate 1 (formed by laminating two resin-coated coppers).

Copper-Free Laminate 1 (Formed by Laminating Two Resin-Coated Coppers)

The above copper-clad laminate 1 is etched to remove the two copper foils outside to obtain a copper-free laminate 1 (formed by laminating two resin-coated coppers).

Copper-clad laminate 2 (formed by two resin-coated coppers and one brown oxide treated core)

For each of Examples and Comparative Examples, two resin-coated coppers freshly made using the above method are prepared. The resin-coated coppers are stacked with a brown oxide treated core 1 (such as the brown oxide treated core product EM-S526 available from Elite Material Co., Ltd.), in which the semi-cured resin layer of one resin-coated copper is adjacent to one side of the brown oxide treated core, and the semi-cured resin layer of the other resin-coated copper is adjacent to the other side of the brown oxide treated core. In a laminator in a vacuum environment, they are laminated for 2 hours with a lamination pressure of 300 psi and a lamination temperature of 220° C. to form a copper-clad laminate 2 (formed by laminating two resin-coated copper and one brown oxide treated core).

The manufacturing method of the brown oxide treated core 1 is described as follows. One prepreg (such as product EM-S526 available from Elite Material Co., Ltd., using 1078 E-glass fiber fabric, RC-65%) is prepared. One copper foil is stacked on each of the two sides of the prepreg, and then they are laminated and cured for 2 hours at a vacuum, high temperature (195° C.) and high pressure (360 psi) to obtain a copper-containing core. Then, the copper-containing core is subject to a well-known brown oxide treatment of a copper foil to obtain the brown oxide treated core 1.

Copper-Clad Laminate 3

For each of Examples and Comparative Examples, two resin-coated coppers freshly made using the above method are prepared. The two resin-coated coppers are stacked, in which the semi-cured resin layers of the two resin-coated coppers are adjacent inside and the copper foils of the two resin-coated coppers are outside. In a laminator in a vacuum environment, the two resin-coated coppers are laminated for 2 hours with a lamination pressure of 300 psi and a lamination temperature of 220° C. to form a copper-clad laminate 3.

Copper-Clad Laminate 4

Figure 2:
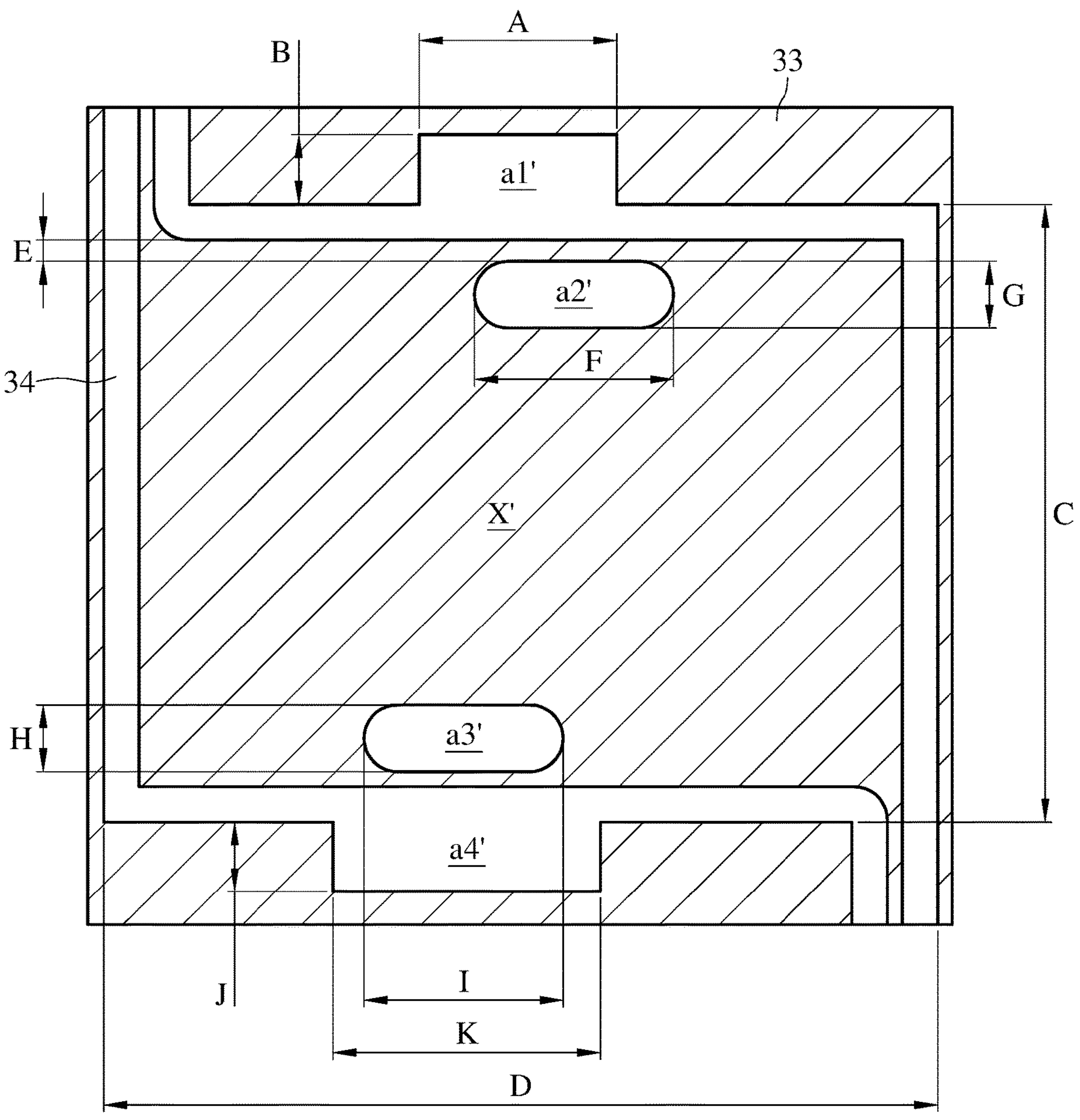
FIG. 2 is an enlarging view of a portion P in FIG. 1.
Figure 3:
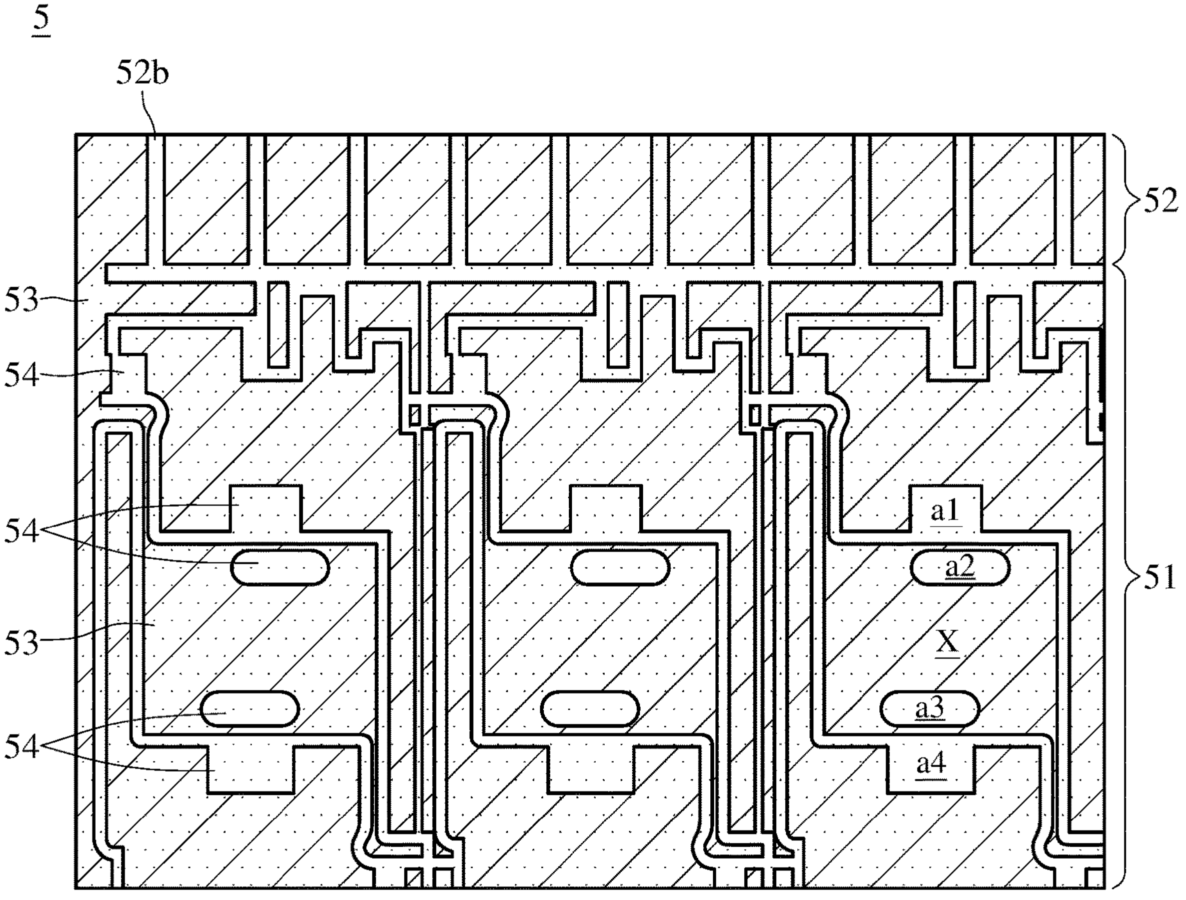
FIG. 3 is a schematic diagram of a partial region of a circuit-containing laminate.

For each of Examples and Comparative Examples, two resin-coated coppers freshly made using the above method and one copper-clad laminate 3 are prepared. Each of the resin-coated copper has a length of 30 centimeters and a width of 21 centimeters. Please refer to FIGS. 1 and 2, FIG. 1 is a schematic diagram of a partial region of a copper-clad laminate, and FIG. 2 is an enlarging view of a portion P in FIG. 1. A circuit area is produced on the surface copper foils of the two sides of the copper-clad laminate 3 to make a copper-containing area 33 and a copper-free area 34 (the copper-free area also refers to the open area). The circuit area is made by well-known lithography process. Then, the surface copper foil of the copper-containing area 33 of the copper-clad laminate 3 is subject to a well-known brown oxide treatment to obtain a brown oxide treated core 2. The brown oxide treated core 2 includes at least the following areas (FIG. 2): a brown oxide treated large copper-containing area X' (with a length D of 6 cm and a width C of 4.5 cm), a copper-free open area a1' (with a length A of 1 cm and a width B of 1 cm), a copper-free open area a2' (with a length F of 1 cm and a width G of 0.5 cm), a copper-free open area a3' (with a length I of 0.5 cm and a width H of 0.5 cm) and a copper-free open area a4' (with a length K of 1.5 cm and a width J of 1 cm), in which the distance E between the open area a2' and the open area a1' is 0.1 cm, and the open area a2' and the open area a3' is in the range of the large copper-containing area X'. One resin-coated copper, one brown oxide treated core 2 and one resin-coated copper are stacked in sequence, in which the semi-cured resin layers of the two resin-coated coppers are staked toward the brown oxide treated core 2. They are laminated and cured for 2 hours at a vacuum, a lamination pressure of 300 psi and a lamination temperature of 220° C. to form a copper-clad laminate 4. After lamination of the copper-clad laminate 4, the resin composition fills in the copper-free area 34 and covers the copper-containing area 33, and the resin composition is cured after lamination. In FIG. 3, the copper-containing area 33 covered with the cured resin composition is represented by the copper-containing area 53, and the copper-free area 34 filled with the cured resin composition is represented by the resin-filling area 54. The open area a1' to the open area a4' of the copper-free area 34 are filled with the resin composition of the resin-coated copper and formed as the resin-filling area 54 after the resin composition is cured. The open area $a_1$' to the open area a4' and the large copper-containing area X' respectively correspond to the filling area a1 to the filling area a4 and the large copper-containing area X in FIG. 3. That is, the open area a1' is formed to the filling area a1 after filling and curing the resin composition, and similarly, the open area a2' to the open area a4' are formed to the filling area a2 to the filling area $a_4$.

Circuit-Containing Laminate 5

The above copper-clad laminate 4 is etched to remove the two copper foils outside to obtain a circuit-containing laminate 5. The circuit-containing laminate 5 includes no copper foil at two outsides, while the circuit-containing laminate 5 includes the copper-containing circuit area of the brown oxide treated core 2 inside. Please refer to FIG. 3, FIG. 3 is a schematic diagram of a partial region of a circuit-containing laminate. The circuit-containing laminate 5 may be divided into a circuit area 51 and an edge area 52 and include a copper-containing area 53 which is subject to a brown oxide treatment and a resin-filling area 54, in which the resin composition fills in the copper-free area 34 of the copper-clad laminate 3 and covers the copper-containing area 33 of the copper-clad laminate 3 (FIG. 1). The copper-containing area 33 of the copper-clad laminate 3 (FIG. 1) is formed as the copper-containing area 53 of the circuit-containing laminate 5 (FIG. 3).

For the above samples, the testing method and the properties are described below.

Resin Flow 1

For each of Examples and Comparative Examples, two resin-coated coppers freshly made using the above method are prepared. The two resin-coated coppers are stacked, in which the resin layers of the two resin-coated coppers are adjacent inside and the copper foils of the two resin-coated coppers are outside, and they are cut into a size of 4 inches×4 inches (16 $in^2$). The stacked resin-coated coppers is weighted as W0. Then, one release film is stacked on each of two sides of the stacked resin-coated coppers, and they are placed on a heating plate in a well-known resin flow laminator. Then, they are laminated and cured for 5 minutes at a lamination pressure of 1452 kgf/16 $in^2$ and a lamination temperature of 171° C., and then cooled to room temperature to get a sample. The cured resin overflowed from four sides of the sample is removed to obtain the copper-clad laminate sample 1. The copper-clad laminate sample 1 is weighted as Wd. The test value of the resin flow (Resin flow 1 in %) is $[(W0-Wd)/(W0-2\times Wc_u)]\times 100\%$, wherein $Wc_u$ is the weight of RTF (Toz) copper foil cut into a size of 4 inches×4 inches (16 $in^2$).

Resin Flow 2

For each of Examples and Comparative Examples, two resin-coated coppers are prepared and stored for 30 days at room temperature (25° C.) to obtain the resin-coated coppers stored for 30 days, and this is 30 days after preparing the resin-coated copper. According to the preparation method and the testing method for the samples for Resin flow 1, the copper-clad laminate sample 2 and its test value of the resin flow (Resin flow 2 in %) are obtained.

Resin Flow Rate of Copper-Clad Laminate

The resin flow rate of copper-clad laminate (in %) is defined as [(Resin flow 1−Resin flow 2)/Resin flow 1]*100%. The value of the resin flow rate of copper-clad laminate greater than or equal to 1% means a significant difference, which means there is a significant technical difficulty. The lower resin flow rate of copper-clad laminate is better, which means the resin flow of the resin-coated copper does not decline as the storage time increases. The higher resin flow rate of copper-clad laminate may cause an increase in the defective rate of filling during the layer build-up process of the resin-coated copper and cause voids in which no cured resin composition is contained therein may be generated in the insulating layer of the printed circuit board, thereby reducing the production yield of the printed circuit board. The resin flow rate of copper-clad laminate less than or equal to 15% is safe, while the resin flow rate of copper-clad laminate greater than 15% may decrease the production yield.

Filling Level of Circuit-Containing Laminate

Figure 4A:
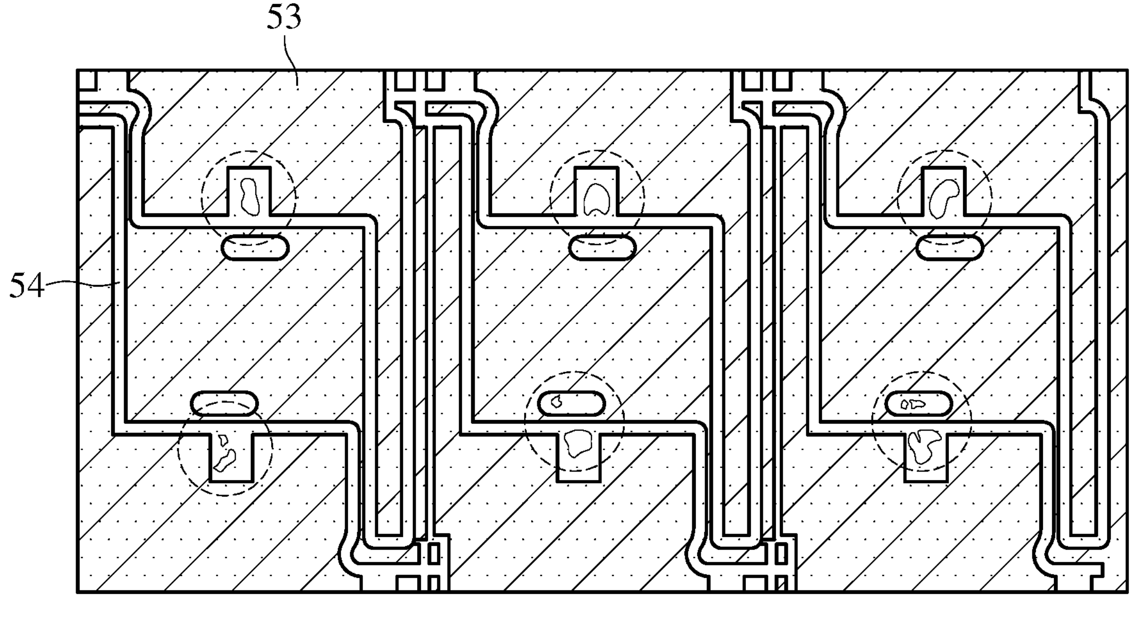
FIG. 4A is a schematic diagram showing voids present in a circuit area of a circuit-containing laminate.
Figure 4B:
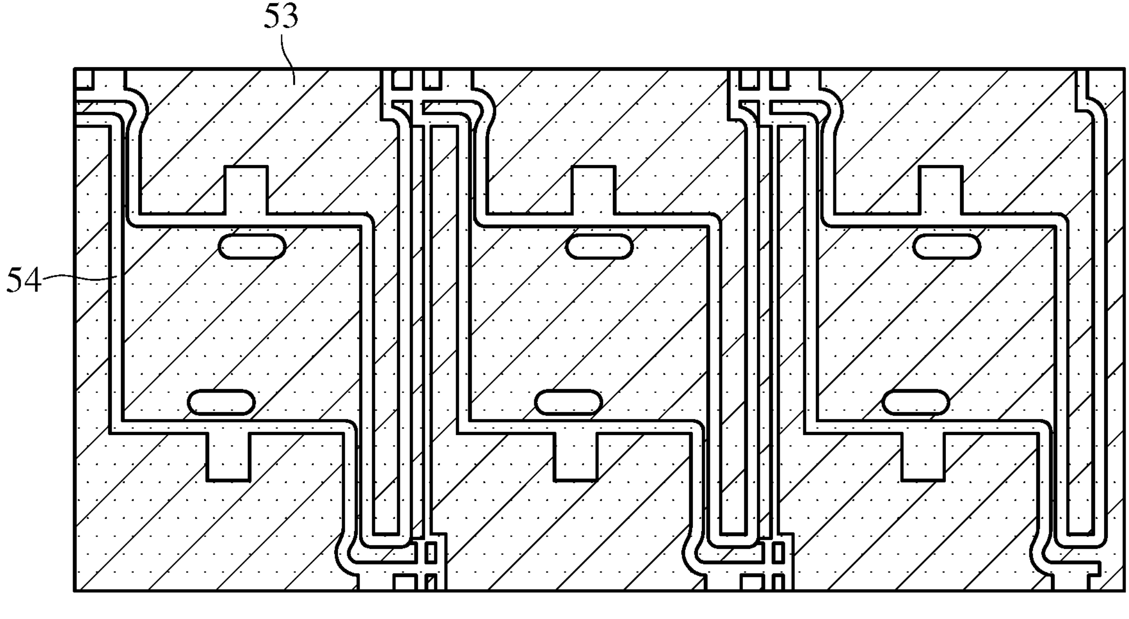
FIG. 4B is a schematic diagram showing no void present in a circuit area of a circuit-containing laminate.

The test of the filling level of circuit-containing laminate is to use the above circuit-containing laminate 5 (FIG. 3) and to observe whether any void is present in the insulating layer of the filling area (including the filling area a1 to the filling area a4) of the circuit-containing laminate 5 with an optical microscope by an operator. Please refer to FIGS. 4A and 4B, FIGS. 4A and 4B show a part of the circuit area 51 of the circuit-containing laminate, FIG. 4A is a schematic diagram showing voids present in a circuit area of a circuit-containing laminate, FIG. 4B is a schematic diagram showing no void present in a circuit area of a circuit-containing laminate, and the voids are marked with dotted lines in FIG. 4A. Specifically, the operator uses the optical microscope to observe the appearance surface of the circuit-containing laminate 5. When a spherical or spherical-like unfilled area with a diameter of more than 0.5 mm is present, it is considered as existing void. When a non-spherical and irregular unfilled area with a diameter of more than 0.5 mm is present, it is also considered as existing void. When there is at least one void existing in the filling area (including the filling area a1 to the filling area a4) of the circuit-containing laminate 5, it is considered as unable to fully fill the corresponding open area. The filling levels of circuit-containing laminate are classified as follows: Level 1 is able to fully fill the open area with an area greater than or equal to 100 $cm^2$, such as able to fully fill the open area with an area greater than or equal to 25 $cm^2$ to less than or equal to 150 $cm^2$; Level 2 is able to fully fill the open area with an area greater than or equal to 25 $cm^2$ to less than 100 $cm^2$; Level 3 is able to fully fill the open area with an area greater than or equal to 25 $cm^2$ to less than 50 $cm^2$. In other words, in the test results of the circuit-containing laminate in each group, when all the filling area $a_1$ to the filling area a4 are fully filled and no void is present (that is, the area of the open area that can be filled is greater than or equal to 100 $cm^2$), it is marked as Level 1; when both filling area a2 and the filling area a3 are fully filled but there is at least one void present in the filling area a1 (that is, the area of the open area that can be fully filled is greater than or equal to 25 $cm^2$ to less than 100 $cm^2$), it is marked as Level 2; when the filling area a3 is fully filled but there is at least one void present in the filling area a2 (that is, the area of the open area that can be fully filled is 25 $cm^2$), it is marked as Level 3. Level 1 means no void is present in the sample, and Level 1 is acceptable. Level 2 and Level 3 are not acceptable, and the circuit-containing laminate 5 (the circuit board or wiring board) with Level 2 or Level 3 needs to be scrapped.

Pattern at the Edge of Circuit-Containing Laminate

Figure 5A:
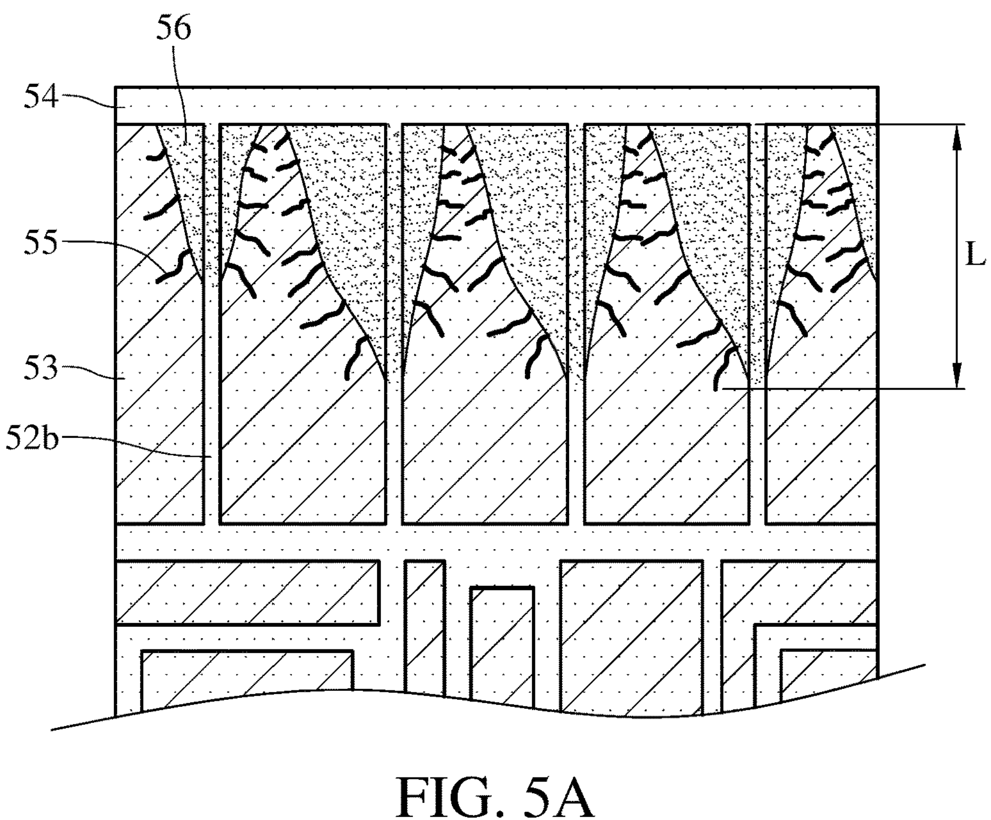
FIG. 5A is a schematic diagram showing severe branch-like patterns and flow trace areas present in an edge area of a circuit-containing laminate.
Figure 5B:
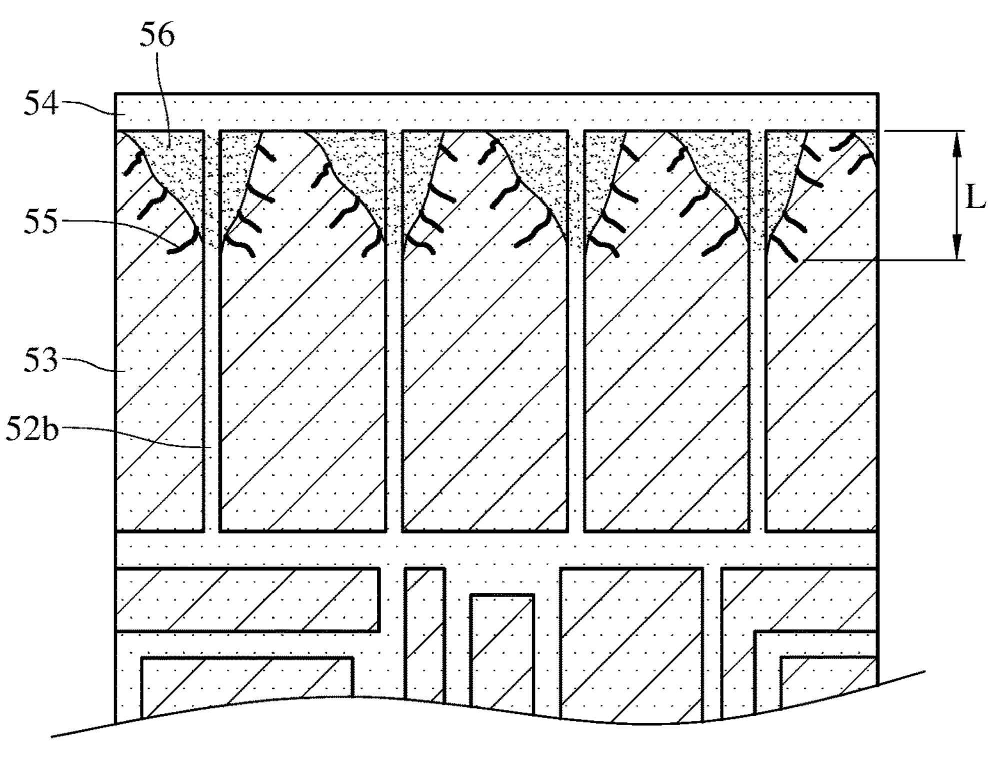
FIG. 5B is a schematic diagram showing slight branch-like patterns and flow trace areas present in an edge area of a circuit-containing laminate.
Figure 5C:
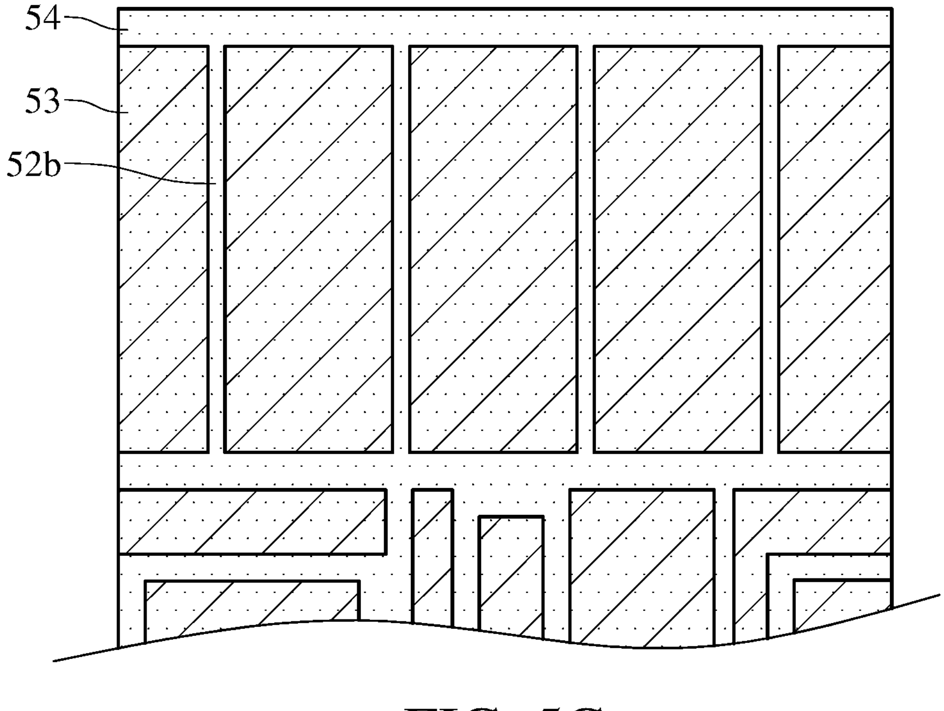
FIG. 5C is a schematic diagram showing no branch-like pattern and no flow trace area present in an edge area of a circuit-containing laminate.

Please refer to FIGS. 5A to 5C, FIGS. 5A to 5C show a part of the edge area 52 of the circuit-containing laminate, FIG. 5A is a schematic diagram showing severe branch-like patterns and flow trace areas present in an edge area of a circuit-containing laminate, FIG. 5B is a schematic diagram showing slight branch-like patterns and flow trace areas present in an edge area of a circuit-containing laminate, and FIG. 5C is a schematic diagram showing no branch-like pattern and no flow trace area present in an edge area of a circuit-containing laminate. A guide area 52*b* is designed in the edge area 52 of the circuit-containing laminate 5, i.e. the guide bar known in the field of the printed circuit board. In the case that a branch-like pattern 55 and a flow trace area 56 are present in the edge area 52, the maximum distance from the innermost branch-like pattern 55 and/or flow trace area 56 to the outermost edge of the circuit-containing laminate is measured and defined as a distance L of the pattern at the edge of circuit-containing laminate (FIGS. 4A and 4B), wherein L≤10 mm is acceptable, while L>10 mm is not acceptable. When the branch-like pattern or the flow trace area with L>10 mm is present in the edge of the circuit-containing laminate 5, it may cause the reliability test of the printed circuit board fails, such as deteriorating the dielectric constant uniformity of circuit boards, but the present disclosure is not limited thereto. An operator visually observes whether the branch-like pattern 55 and the flow trace area 56 are present in the edge area of the circuit-containing laminate 5, and the distance L may be measured by a ruler as a tool in the visual observation. When the resin composition flows evenly during filling, no branch-like pattern 55 and flow trace area 56 are generated. In contrast, when the resin composition flows unevenly during filling, the branch-like pattern 55 and the flow trace area 56 may be generated. Using a scanning electron microscope to observe the sliced sample with a region of the branch-like pattern 55 and the flow trace area 56, it can be observed that the resin and the inorganic filler in the insulating layer 56 are not evenly distributed in the region of the branch-like pattern 55 and the flow trace area, and the filling thickness of the flow trace area 56 is thinner. In contrast, in the sliced sample without a region of the branch-like pattern and flow trace area, it can be observed that the resin and the inorganic filler in the insulating layer are evenly distributed, and the filling thickness of a region without the branch-like pattern and the flow trace area is even.

X-Axis Coefficient of Thermal Expansion (X-CTE)

In the test of the X-axis coefficient of thermal expansion, the above copper-free laminate 1 (formed by laminating two resin-coated coppers) is selected as a sample for thermal mechanical analysis (TMA). The copper-free laminate 1 is cut into a sample with a length of 15 mm and a width of 2 mm. The sample is heated at a heating rate of 5° C. per minute from 50° C. to 260° C., and the X-axis coefficient of thermal expansion (in ppm/° C.) of each sample is measured in a temperature range of 40° C. to 125° C. (α1) by reference to IPC-TM-650 2.4.24.5. The lower X-axis coefficient of thermal expansion means a better dimensional change property. The X-axis coefficient of thermal expansion greater than or equal to 1 ppm/° C. means a significant difference, which means there is a significant technical difficulty.

Copper Foil Peeling Strength (Peel Strength, P/S)

The above copper-clad laminate 2 is cut into a rectangle sample with a width of 24 mm and a length of greater than 60 mm, and the surface copper foil is etched into a strip copper foil with a width of 3.18 mm and a length of greater than 60 mm. The force (lb/in) required to peel copper foil from the surface of the laminate is measured at a normal temperature (about 25° C.) using a tensile strength tester by reference to IPC-TM-650 2.4.8. The higher copper foil peeling strength is better. The copper foil peeling strength of each sample greater than or equal to 0.10 lb/in means a significant difference, which means there is a significant technical difficulty. The copper foil peeling strengths of Examples E1 to E15 are all greater than 4.5 lb/in, such as between 4.7 lb/in and 5.3 lb/in.

According to the test results, the following can be observed.

Examples E1 to E15 using the resin composition of the present disclosure including 100 parts by weight of the resin A, 5 parts by weight to 15 parts by weight of the compound having the structure represented by Formula (1), and 2 parts by weight to 15 parts by weight of the compound B having the structure represented by Formula (2), Formula (3) or Formula (4) can all achieve the following properties: the resin flow rate of copper-clad laminate of less than or equal to 10%, the filling level of circuit-containing laminate of level 1, the pattern at the edge of circuit-containing laminate of less than or equal to 10 mm, the X-axis coefficient of thermal expansion of less than or equal to 30 ppm/° C., and the copper foil peeling strength of greater than or equal to 4.5 lb/in.

Compared to Example E1, Comparative Example C2 without the compound having the structure represented by Formula (1) of the present disclosure but including only the compound B having the structure represented by Formula (2), and Comparative Example 3 without the compound having the structure represented by Formula (1) of the present disclosure but including another allyl-containing cyanurate, both Comparative Examples C2 and C3 cannot simultaneously achieve the following properties: the resin flow rate of copper-clad laminate of less than or equal to 10%, the filling level of circuit-containing laminate of level 1, the pattern at the edge of circuit-containing laminate of less than or equal to 10 mm, the X-axis coefficient of thermal expansion of less than or equal to 30 ppm/° C., and the copper foil peeling strength of greater than or equal to 4.5 lb/in.

Compared to Example E1, Comparative Examples C1 and C5 without the compound B of the present disclosure, and Comparative Examples C6 to C8 without the compound B of the present disclosure but including monofunctional or bifunctional acrylate-containing compound, all Comparative Examples C1 and C5 to C8 cannot simultaneously achieve the following properties: the resin flow rate of copper-clad laminate of less than or equal to 10%, the filling level of circuit-containing laminate of level 1, the pattern at the edge of circuit-containing laminate of less than or equal to 10 mm, the X-axis coefficient of thermal expansion of less than or equal to 30 ppm/° C., and the copper foil peeling strength of greater than or equal to 4.5 lb/in.

Compared to Example E1, Comparative Examples C4 and C9 without both the compound having the structure represented by Formula (1) and the compound B of the present disclosure, both Comparative Examples C4 and C9 cannot simultaneously achieve the following properties: the resin flow rate of copper-clad laminate of less than or equal to 10%, the filling level of circuit-containing laminate of level 1, the pattern at the edge of circuit-containing laminate of less than or equal to 10 mm, the X-axis coefficient of thermal expansion of less than or equal to 30 ppm/° C., and the copper foil peeling strength of greater than or equal to 4.5 lb/in.

overall, the resin composition of the present disclosure may simultaneously achieve at least one of the following properties: the resin flow rate of copper-clad laminate of less than or equal to 10%, the filling level of circuit-containing laminate of level 1, the pattern at the edge of circuit-containing laminate of less than or equal to 10 mm, the X-axis coefficient of thermal expansion of less than or equal to 30 ppm/° C., and the copper foil peeling strength of greater than or equal to 4.5 1b/in.

The product, such as a resin-coated copper, a laminate or a printed circuit board, made from the resin composition of the present disclosure has an excellent performance in at least one of the resin flow rate of copper-clad laminate, the filling level of circuit-containing laminate, the pattern at the edge of circuit-containing laminate, the X-axis coefficient of thermal expansion and the copper foil peeling strength, therefore, the product can be served as a high-performance laminate that satisfies the comprehensive demands.

What is claimed is:

1. A resin composition, comprising:

100 parts by weight of resin A, comprising vinyl group-containing polyphenylene ether resin or maleimide resin;

5 parts by weight to 15 parts by weight of a compound having a structure represented by Formula (1); and 2 parts by weight to 15 parts by weight of a compound B, comprising a compound having a structure represented by Formula (2), a compound having a structure represented by Formula (3) or a compound having a structure represented by Formula (4);

wherein

Formula (1)

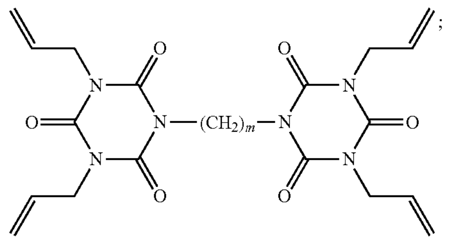

in Formula (1), m is an integer of 2 to 18;

Formula (2)

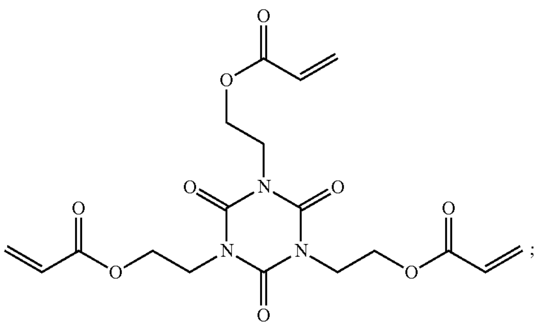

Formula (3)

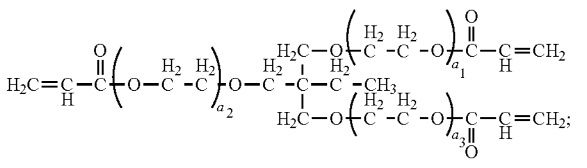

in Formula (3), each of $a_1$, $a_2$ and $a_3$ is independently an integer of 0 to 7;

Formula (4)

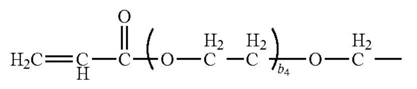

-continued

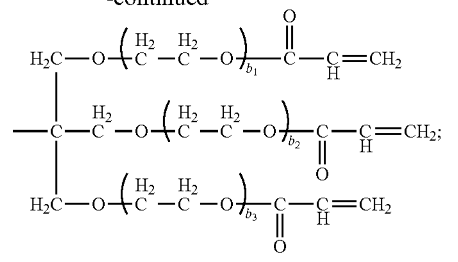

in Formula (4), each of b1, b2, b3 and b4 is independently an integer of 0 to 9.

2. The resin composition of claim 1, wherein the compound having the structure represented by Formula (3) comprises a compound having a structure represented by Formula (3-1):

Formula (3-1)

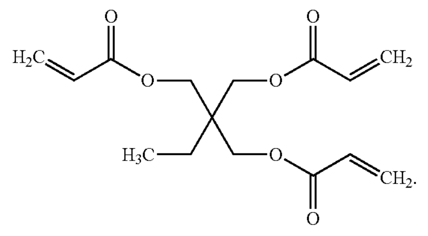

3. The resin composition of claim 1, wherein the compound having the structure represented by Formula (4) comprises a compound having a structure represented by Formula (4-1):

Formula (4-1)

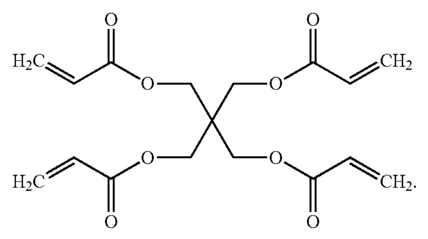

4. The resin composition of claim 1, further comprising 5 parts by weight to 20 parts by weight of resin C, wherein the resin C comprises polyolefin resin, epoxy-containing acrylate resin, polyvinyl butyral resin, polyimide resin or phenoxy resin.

5. The resin composition of claim 1, further comprising inorganic filler, silane coupling agent, inhibitor, flame retardant, coloring agent, toughening agent, core-shell rubber or solvent.

6. A product made from the resin composition of claim 1, comprising a resin-coated copper, a laminate or a printed circuit board.

7. The product of claim 6, having at least one of the following properties:

a resin flow rate of copper-clad laminate as measured by reference to IPC-TM-650 2.3.17 of less than or equal to 10.0%;

a X-axis coefficient of thermal expansion as measured by reference to IPC-TM-650 2.4.24.5 of less than or equal to 30 ppm/° C.; and a copper foil peeling strength as measured by reference to IPC-TM-650 2.4.8 of greater than or equal to 4.5 lb/in.

* * * * *